United States Patent
Shin et al.

(10) Patent No.: US 10,236,560 B2
(45) Date of Patent: Mar. 19, 2019

(54) ANTENNA AND ELECTRONIC DEVICE INCLUDING THE SAME

(71) Applicant: SAMSUNG ELECTRONICS CO., LTD., Suwon-si, Gyeonggi-do (KR)

(72) Inventors: Yongjoo Shin, Suwon-si (KR); Ji-Hyun Park, Seongnam-si (KR); Kyung-Hee Lee, Seoul (KR); Juyeong Lee, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/712,675

(22) Filed: Sep. 22, 2017

(65) Prior Publication Data

US 2018/0102586 A1 Apr. 12, 2018

(30) Foreign Application Priority Data

Oct. 10, 2016 (KR) .................. 10-2016-0130702

(51) Int. Cl.
*H01Q 1/24* (2006.01)
*H01Q 5/314* (2015.01)
(Continued)

(52) U.S. Cl.
CPC .............. *H01Q 1/243* (2013.01); *H01Q 1/44* (2013.01); *H01Q 5/314* (2015.01); *H01Q 5/328* (2015.01); *H01Q 5/364* (2015.01); *H01Q 7/00* (2013.01); *H04B 1/48* (2013.01); *H04M 1/0202* (2013.01); *H04B 2001/485* (2013.01); *H04M 1/026* (2013.01)

(58) Field of Classification Search
CPC .................. H01Q 5/314; H01Q 1/44
See application file for complete search history.

(56) References Cited

U.S. PATENT DOCUMENTS 9,112,271 B2   8/2015  Mo et al.
9,190,714 B2   11/2015 Eom et al.
(Continued)

FOREIGN PATENT DOCUMENTS

WO     2015/199263     12/2015

OTHER PUBLICATIONS

Search Report and Written Opinion dated Jan. 19, 2018 in counterpart International Patent Application No. PCT/KR2017/010850.

*Primary Examiner* — Tuan H Nguyen
(74) *Attorney, Agent, or Firm* — Nixon & Vanderhye P.C.

(57) ABSTRACT

According to various example embodiments, an electronic device including: a housing; a conductive member formed as a part of the housing or disposed in the housing as at least a part of the housing; a communication circuit electrically connected to a first region of the conductive member; a ground electrically connected to a second region of the conductive member spaced from the first region of the conductive member; a tunable circuit interposed in an electric connection path electrically connected with the ground in a third region of the conductive member, the third region being located between the first region and the second region of the conductive member; and at least one processor configured to generate a control signal based on a current mode of the electronic device and to provide the control signal to the tunable circuit.

20 Claims, 16 Drawing Sheets

(51) Int. Cl.
*H01Q 1/44* (2006.01)
*H04B 1/48* (2006.01)
*H04M 1/02* (2006.01)
*H01Q 7/00* (2006.01)
*H01Q 5/328* (2015.01)
*H01Q 5/364* (2015.01)

(56) References Cited

U.S. PATENT DOCUMENTS

2012/0229347 A1\* 9/2012 Jin .................. H01Q 1/243
 343/702
2014/0078008 A1 3/2014 Kang et al.
2015/0280771 A1\* 10/2015 Mow ................ H01Q 1/243
 455/77
2016/0064820 A1 3/2016 Kim et al.

\* cited by examiner

| State | CTRL 1 | CTRL 2 | CTRL 3 | Mode |
|---|---|---|---|---|
| 1 | 0 | 0 | 0 | RFC-RF1 open, RFC-RF2 open |
| 2 | 0 | 0 | 1 | RFC-RF1 open, RFC-RF2 short |
| 3 | 0 | 1 | 0 | RFC-RF1 6 pF, RFC-RF2 open |
| 4 | 0 | 1 | 1 | RFC-RF1 8 pF, RFC-RF2 open |
| 5 | 1 | 0 | 0 | RFC-RF1 10 pF, RFC-RF2 open |
| 6 | 1 | 0 | 1 | RFC-RF1 12 pF, RFC-RF2 open |
| 7 | 1 | 1 | 0 | RFC-RF1 14 pF, RFC-RF2 open |

FIG.6B

| Band | CH # | Call Connection | Proximity Sensor | Grip | Data Connection | User Mode | Setting Value T1 | Setting Value T2 | State table | CTRL table |
|---|---|---|---|---|---|---|---|---|---|---|
| 3G W8 (900 Band) | 2712 ~ 2762 | O | O | - | - | H+H | RF1 : 8pF, RF2 : open | RF1 : 6pF, RF2 : open | 4-3 | 011-011 |
| | | O | × | O | - | Hand | RF1 : 14pF, RF2 : open | RF1 : 14pF, RF2 : open | 7-7 | 110-110 |
| | | O | × | × | - | Free | RF1 : open, RF2 : short | RF1 : open, RF2 : short | 2-2 | 001-001 |
| | | × | - | O | O | Hand | RF1 : 14pF, RF2 : open | RF1 : 14pF, RF2 : open | 7-7 | 110-110 |
| | | × | - | × | O | Free | RF1 : open, RF2 : short | RF1 : open, RF2 : short | 2-2 | 001-001 |
| 3G W8 (900 Band) | 2763 ~ 2813 | O | O | - | - | H+H | RF1 : 6pF, RF2 : open | RF1 : 6pF, RF2 : open | 3-3 | 010-010 |
| | | O | × | O | - | Hand | RF1 : 14pF, RF2 : open | RF1 : 12pF, RF2 : open | 7-6 | 110-101 |
| | | O | × | × | - | Free | RF1 : open, RF2 : short | RF1 : open, RF2 : short | 2-2 | 001-001 |
| | 2814~ | . | . | . | . | . | . | . | . | . |
| . | . | . | . | . | . | . | . | . | . | . |
| 3G W5 (800 Band) | 4132 ~ 4165 | O | O | - | - | H+H | RF1 : open, RF2 : short | RF1 : open, RF2 : short | 2-2 | 001-001 |
| | | O | × | O | - | Hand | RF1 : 10pF, RF2 : open | RF1 : 14pF, RF2 : open | 5-7 | 100-110 |
| | | O | × | × | - | Free | RF1 : open, RF2 : short | RF1 : open, RF2 : open | 2-1 | 001-001 |
| . | . | . | . | . | . | . | . | . | . | . |
| LTE B17 (700 Band) | 23730 ~ 23789 | O | O | - | - | H+H | RF1 : open, RF2 : open | RF1 : open, RF2 : open | 2-1 | 001-000 |
| | | O | × | O | - | Hand | RF1 : 14pF, RF2 : open | RF1 : open, RF2 : open | 7-0 | 110-000 |
| | | O | × | × | - | Free | RF1 : open, RF2 : open | RF1 : open, RF2 : open | 1-1 | 000-000 |
| . | . | . | . | . | . | . | . | . | . | . |

FIG.9

ANTENNA AND ELECTRONIC DEVICE INCLUDING THE SAME

CROSS-REFERENCE TO RELATED APPLICATION

The present application is based on and claims priority under 35 U.S.C. § 119 to an application filed in the Korean Intellectual Property Office on Oct. 10, 2016 and assigned Serial No. 10-2016-0130702, the content of which is incorporated by reference in its entirety.

BACKGROUND

1. Technical Field

The present disclosure relates generally to an electronic device, and for example, to an electronic device including an antenna.

2. Description of Related Art

As functional differentials among manufacturers of electronic devices have noticeably narrowed, the electronic devices are becoming slim in order to meet consumers' desires to purchase, and are developing to differentiate their functional elements while increasing rigidity of electronic devices and improving designs. As part of these trends, electronic devices are competing to prevent and/or reduce degradation of radiation performance in advance and realize excellent performance, while ensuring efficient arrangement spaces of at least one antenna which should be essentially provided for communication from among their elements.

SUMMARY

According to various example embodiments, in antennas used in electronic devices, the volume and the number of antenna emitters mounted therein may be determined based on a frequency, a bandwidth, and a type of each service. For example, frequencies vary from region to region around the world, but typically, a low band of 700 MHz-900 MHz, a mid band of 1700 MHz-2100 MHz, and a high band of 2300 MHz-2700 MHz may be used as a main frequency band. Additionally, various wireless communication services such as Bluetooth (BT), global positioning system (GPS), wireless fidelity (WiFi), or the like may be used. Electronic devices require a plurality of antennas to support the above-described communication bands, whereas electronic devices are required to become slimmer and thus may have limited antenna volume spaces. To address this problem, methods of binding service bands having similar frequency bands and distributing them to plural antennas are provided.

For example, in the case of an antenna responsible for voice/data communication (a general packet radio service (GPRS), wideband code division multiple access (WCDMA), long term evolution (LTE), or the like), which is a main communication of terminals, the antenna may be disposed at a lower end of a device where few metal components which may degrade the performance of the antenna are installed. According to the Europe-oriented standards, 24 bands in total, such as 2G (GSM850, EGSM, DCS, PCS), WCDMA (B1, B2, B5, B8), and LTE (B1, B2, B3, B4, B5, B7, B8, B12, B17, B18, B19, B20, B26, B38, B39, B40, B41), may be implemented, but in fact, it is difficult to implement all bands in a single antenna while satisfying network operators' specifications and specific absorption rate (SAR) standard requirements, and also minimizing/reducing effects on the human body. Therefore, antennas may be implemented by binding service bands having similar frequency bands across at least two regions. For example, one antenna may be designed to implement 2G (GSM850, EGSM, DCS, PCS), WCDMA (B1, B2, B5, B8), and LTE (B1, B2, B3, B4, B5, B8, B12, B17, B18, B19, B20, B26, B39), and another antenna may be designed to implement LTE (B7, B38, B40, B41).

In addition, when the exterior (for example, a housing) of an electronic device is made of a metal member (for example, a metal bezel or the like) in order to increase rigidity which may be reduced by miniaturization and slimness of electronic devices, the metal member may be utilized as an antenna emitter and designed as an antenna, rather than an antenna being separately designed unlike an injection molding member of a dielectric material.

For example, when at least a part (for example, a metal bezel) of the housing used as the border of an electronic device is utilized as an antenna emitter, the part may be implemented to operate in a desired frequency band by adjusting an electric length of the antenna from a feeding location by disconnecting a specific location of the metal member by a segment of a dielectric material.

In recent years, metal members used as a housing may be electrically connected with each other and may be utilized as a multi-band antenna emitter which operates in at least two different frequency bands. In this case, the corresponding unit metal member used as the antenna emitter may be designed to be optimized in a carrier aggregation (CA) (for example, 2CA, 3CA, 4CA, or the like) or multi input multi output (MIMO) environment.

When a frequency is shifted in a low band (for example, a frequency is shifted according to a network operator or a region), an antenna having the above-described configuration may adjust an electric length of an antenna emitter by changing a ground position of a metal member. However, in electronic devices which are becoming miniaturized and slimmer, there may be a spatial limit to changing the ground position to cover the shift of various operating frequencies of the low band. In addition, even when a matching element is added to a feeding line of the antenna, only impedance matching is changed through the matching element and a resonant frequency is not changed. Therefore, it may be difficult to shift various low bands in practice.

Furthermore, antennas having the above-described configuration may have a problem that, when a frequency is shifted in a low band, an operating frequency band of a mid band and/or a high band designed to be optimized in a desired frequency band is shifted in transmitting and receiving signals, and thus radiation performance of an antenna emitter is degraded.

To address the above-discussed deficiencies, it is an example aspect of the present disclosure to provide at least the advantages described below. Accordingly, the present disclosure provides an antenna and an electronic device including the same.

An example aspect of the present disclosure provides an antenna which can shift frequencies of various bands in a low band and also can contribute to slimness of an electronic device, and an electronic device including the same.

Another example aspect of the present disclosure provides an antenna which, even when a frequency shift occurs in a low band, can prevent and/or reduce degradation of radiation performance of the antenna in advance by avoiding interference in a mid band and/or a high band, and an electronic device including the same.

According to an example aspect of the present disclosure, an electronic device is provided, including: a housing; a conductive member formed as a part of the housing or disposed in the housing as at least a part of the housing; a communication circuit electrically connected to a first region of the conductive member; a ground electrically connected to a second region of the conductive member, the second region being spaced from the first region; a tunable circuit interposed in an electrical connection path electrically connected with the ground in a third region of the conductive member between the first region and the second region; and at least one processor configured to generate a control signal based on a current mode of the electronic device and to provide the control signal to the tunable circuit.

According to another example aspect of the present disclosure, a method for operating of an electronic device is provided, wherein the electronic device includes a conductive member connected with a communication circuit and a ground in different regions and operating as an antenna, and at least one tunable circuit interposed in an electric path through which the conductive member and the ground are connected to each other, the method including: identifying at least one piece of information of state information and communication information of the electronic device; determining a current mode of the electronic device based on the identified information; determining a control signal based on the determined mode; and controlling the tunable circuit using the determined control signal to shift an operating frequency band of the conductive member.

BRIEF DESCRIPTION OF THE DRAWINGS

The above and other aspects, features and attendant advantages of the present disclosure will be more apparent and readily appreciated from the following detailed description, taken in conjunction with the accompanying drawings, in which like reference numerals refer to like elements, and wherein:

FIG. 6B is a table illustrating example switching states based on control signals of a tunable circuit according to various example embodiments of the present disclosure;

FIG. 9 is a lookup table (LUT) in which switching states of a pair of tunable circuits and corresponding control signals are mapped onto each other according to state information of an electronic device according to various example embodiments of the present disclosure;

DETAILED DESCRIPTION

Figure 1:
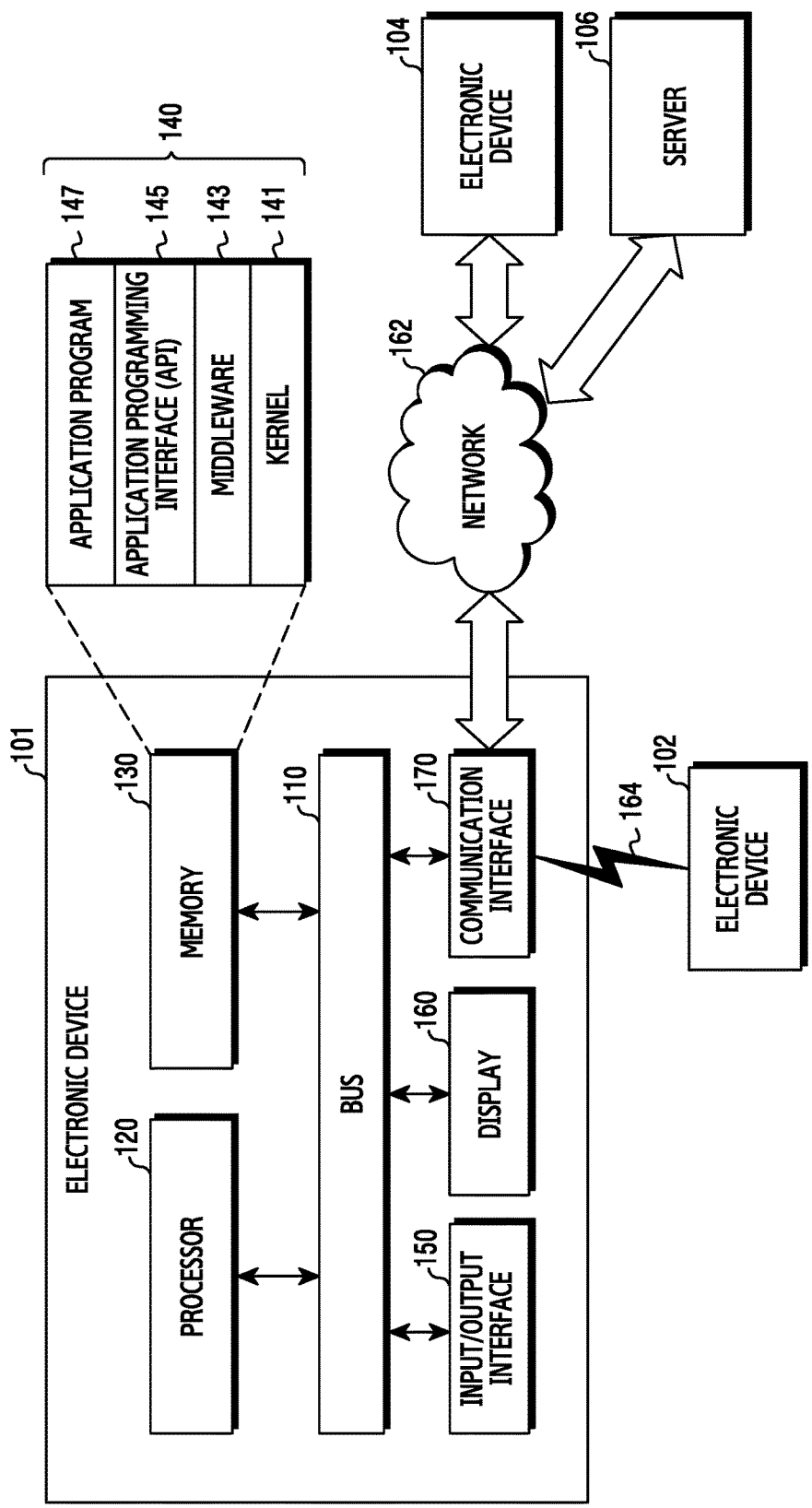
FIG. 1 is a diagram illustrating an example network environment including an electronic device according to various example embodiments of the present disclosure.

Various example embodiments of the present disclosure will now be described in greater detail with reference to the accompanying drawings. In the following disclosure, specific details such as detailed configuration and components are merely provided to assist the overall understanding of these example embodiments of the present disclosure. Therefore, it should be apparent to those skilled in the art that various changes and modifications of the various example embodiments described herein can be made without departing from the scope and spirit of the present disclosure. For example, those skilled in the art will understand that the principles of the present disclosure may be implemented in any suitably arranged electronic device.

In addition, descriptions of well-known functions and constructions may be omitted for clarity and conciseness.

The terms and words used in the following description and claims are not limited to their dictionary meanings, but are used to convey a clear and consistent understanding of the present disclosure. Accordingly, it should be apparent to those skilled in the art that the following description of embodiments of the present disclosure is provided for illustrative purposes only and not for the purpose of limiting the present disclosure, as defined by the appended claims and their equivalents.

Singular terms such as "a," "an," and "the" include plural references unless the context clearly dictates otherwise. Thus, for example, "a component surface" includes reference to one or more of such surfaces.

Herein, terms such as "have," "may have," "include," and "may include" indicate the presence of corresponding features (e.g., elements such as numerical values, functions, operations, or parts), but do not preclude the presence of additional features.

The terms "A or B," "at least one of A or/and B," and "one or more of A or/and B" include all possible combinations of the enumerated items. For example, "A or B," "at least one of A and B," or "at least one of A or B" means (1) at least one A, (2) at least one B, or (3) at least one A and at least one B.

Numerical terms such as "first" and "second" may modify various elements regardless of an order and/or importance of the elements, and do not limit the elements. These terms may be used for the purpose of distinguishing one element from another element. For example, a first user device and a second user device may indicate different user devices, regardless of the order or importance the devices. Accordingly, a first element may be referred to as a second element, and similarly, a second element may be referred to as a first element, without departing from the scope the present disclosure.

When an element (e.g., a first element) is "(operatively or communicatively) coupled with/to" or "connected to" another element (e.g., a second element), the first element may be directly coupled with/to the second element, or there may be an intervening element (e.g., a third element) between the first element and the second element. However, when the first element is "directly coupled with/to" or "directly connected to" the second element, there is no intervening element therebetween.

Herein, the term "module" may refer, for example, to a unit including one of hardware, software, and firmware, or any combination thereof. The term "module" may be interchangeably used with terms, such as unit, logic, logical block, component, and circuit. A module may be a minimum unit of an integrally constituted component or may be a part thereof. A module may be a minimum unit for performing one or more functions or may be a part thereof. A module may be mechanically or electrically implemented. For example, a module may include, for example, and without limitation, at least one of a dedicated processor, a CPU, an application-specific integrated circuit (ASIC) chip, a field-programmable gate array (FPGA), and a programmable-logic device, which are known or will be developed and which perform certain operations.

All of the terms used herein, including technical or scientific terms, have the same meanings as those generally understood by a person having ordinary skill in the related art unless they are defined otherwise. Terms defined in a generally used dictionary should be interpreted as having the same or similar meanings as the contextual meanings of the relevant technology and should not be interpreted as having ideal or exaggerated meanings unless clearly defined as such herein. Even terms defined in the disclosure should not be interpreted as excluding embodiments of the present disclosure.

Example electronic devices may include smart phones, tablet personal computers (PCs), mobile phones, video telephones, electronic book readers, desktop PCs, laptop PCs, netbook computers, workstations, servers, personal digital assistants (PDAs), portable multimedia players (PMI's), Motion Picture Experts Group (MPEG-1 or MPEG-2) Audio Layer 3 (MP3) players, mobile medical devices, cameras, and/or wearable devices, or the like, but are not limited thereto. For example, the wearable devices may include accessory-type wearable devices (e.g., watches, rings, bracelets, anklets, necklaces, glasses, contact lenses, or head-mounted-devices (HMDs)), fabric or clothing integral wearable devices (e.g., electronic clothes), body-mounted wearable devices (e.g., skin pads or tattoos), and/or implantable wearable devices (e.g., implantable circuits), or the like but are not limited thereto.

The electronic devices may include smart home appliances, such as televisions (TVs), digital versatile disk (DVD) players, audio players, refrigerators, air conditioners, cleaners, ovens, microwave ovens, washing machines, air cleaners, set-top boxes, home automation control panels, security control panels, TV boxes (e.g., Samsung Home-Sync™, Apple TV™, or Google TV™), game consoles (e.g., Xbox™ and PlayStation™), electronic dictionaries, electronic keys, camcorders, and/or electronic picture frames, or the like, but are not limited thereto.

The electronic devices may include various medical devices, such as various portable medical measurement devices (e.g., blood glucose meters, heart rate monitors, blood pressure monitors, thermometers, etc.), magnetic resonance angiography (MRA) devices, magnetic resonance imaging (MRI) devices, computed tomography (CT) devices, scanners, ultrasonic devices, etc., navigation devices, GPS receivers, event data recorders (EDRs), flight data recorders (FDRs), vehicle infotainment devices, electronic equipment for vessels (e.g., navigation systems, gyrocompasses, etc.), avionics, security devices, head units for vehicles, industrial or home robots, automatic teller machines (ATMs), point of sale (POS) devices, and/or Internet of Things (IoT) devices (e.g., light bulbs, sensors, electric or gas meters, sprinkler devices, fire alarms, thermostats, street lamps, toasters, exercise equipment, hot water tanks, heaters, boilers, etc.), or the like, but are not limited thereto.

The electronic devices may also include parts of furniture or buildings/structures, electronic boards, electronic signature receiving devices, projectors, or various measuring instruments (e.g., water meters, electricity meters, gas meters, wave meters, etc.), or the like, but are not limited thereto.

The electronic devices may be flexible electronic devices.

The electronic devices may be combinations of the above-described devices.

Additionally, the electronic devices are not limited to the above-described devices, and may include new electronic devices according to the development of new technologies.

Herein, the term "user" may refer to a person who uses an electronic device or may refer to a device (e.g., an artificial intelligence (AI) electronic device) which uses an electronic device.

FIG. 1 is a diagram illustrating an example network environment including an electronic device, according to an example embodiment of the present disclosure.

Referring to FIG. 1, the network environment includes an electronic device 101, which includes a bus 110, a processor (e.g., including processing circuitry) 120, a memory 130, an input/output interface (e.g., including input/output circuitry) 150, a display 160, and a communication interface (e.g., including communication circuitry) 170. Alternatively, the electronic device 101 may omit at least one of the illustrated components and/or include additional components.

The bus 110 may include a circuit for connecting the components and delivering communications such as a control message therebetween.

The processor 120 may include various processing circuitry, such as, for example, and without limitation, at least one of a dedicated processor, a central processing unit (CPU), an application processor (AP), and/or a communication processor (CP). The processor 120 processes an operation or data on control of and/or communication with another component of the electronic device 101.

The processor 120 may also include a microprocessor or any suitable type of processing circuitry, such as one or more general-purpose processors (e.g., ARM-based processors), a digital signal processor (DSP), a programmable logic device (PLD), an ASIC, a field-programmable gate array (FPGA), a graphical processing unit (GPU), a video card controller, etc. In addition, when a general purpose computer accesses code for implementing the processing shown herein, the execution of the code transforms the general purpose computer into a special purpose computer for executing the processing shown herein.

The processor 120, which can be connected to an LTE network, may determine whether a call is connected over a circuit switched (CS) service network using caller identification information, such as a caller phone number of the CS service network, e.g., a 2G or a 3rd generation (3G) network. For example, the processor 120 receives incoming call information, such as a CS notification message or a paging request message of the CS service network over the LTE network, such as circuit-switched fallback (CSFB). The processor 120 being connected to the LTE network receives incoming call information, such as a paging request message over the CS service network, such as single radio LTE (SRLTE).

When receiving an incoming CS notification message or a paging request message of the CS service network over the LTE network, the processor 120 may obtain caller identification information from the incoming call information. The processor 120 may display the caller identification information on the display 160. The processor 120 may determine whether to connect the call based on input information corresponding to the caller identification information displayed on the display 160. For example, when detecting input information corresponding to an incoming call rejection, through the input/output interface 150, the processor 120 may restrict the voice call connection and maintain the LTE network connection. When detecting input information corresponding to an incoming call acceptance, through the input/output interface 150, the processor 120 may connect the voice call by connecting to the CS service network.

When receiving the incoming CS notification message or a paging request message of the CS service network over the LTE network, the processor 120 may obtain caller identification information from the incoming call information. The processor 120 may determine whether to connect the call by comparing the caller identification information with a reception control list. For example, when the caller identification information is included in a first reception control list, such as a blacklist, the processor 120 may restrict the voice call connection and maintain the connection to the LTE network. When the caller identification information is not included in the blacklist, the processor 120 may connect the voice call by connecting to the CS service network. When the caller identification information is included in a second reception control list, such as a white list, the processor 120 may connect the voice call by connecting to the CS service network.

When receiving the incoming call information, such as a paging request message of the CS service network over the LTE network, the processor 120 may send an incoming call response message, such as a paging response message, to the CS service network. The processor 120 may suspend the LTE service and receive the caller identification information, such as a circuit-switched call (CC) setup message, from the CS service network. The processor 120 may determine whether to connect the call by comparing the caller identification information with the reception control list. For example, when the caller identification information is included in the blacklist, the processor 120 restricts the voice call connection and resumes the LTE network connection. When the caller identification information is not included in the he blacklist, the processor 120 may connect the voice call by connecting to the CS service network. For example, when the caller identification information is included in the white list, the processor 120 connects the voice call by connecting to the CS service network.

The memory 130 may include volatile and/or nonvolatile memory. The memory 130 may store commands or data, such as the reception control list relating to at least another component of the electronic device 101. The memory 130 may store software and/or a program 140. The program 140 includes a kernel 141, middleware 143, an application programming interface (API) 145, and/or application programs (or applications) 147. At least some of the kernel 141, the middleware 143, and the API 145 may be referred to as an operating system (OS).

The kernel 141 may control or manage system resources, such as the bus 110, the processor 120, or the memory 130 used for performing an operation or function implemented by the other programs, such as the middleware 143, the API 145, or the applications 147. Further, the kernel 141 may provide an interface through which the middleware 143, the API 145, or the applications 147 connects the individual elements of the electronic device 101 to control or manage the system resources.

The middleware 143 may function as an intermediary for the API 145 or the applications 147 to communicate with the kernel 141, e.g., to exchange data.

In addition, the middleware 143 may process one or more task requests received from the applications 147 according to priorities thereof. For example, the middleware 143 assigns priorities for using the system resources of the electronic device 101, to at least one of the applications 147. As another example, the middleware 143 performs scheduling or load balancing on the one or more task requests by processing the one or more task requests according to the priorities assigned thereto.

The API 145 is an interface through which the applications 147 may control functions provided from the kernel 141 or the middleware 143, and may include at least one interface or function, such as an instruction for file control, window control, image processing, or text control.

The input/output interface 150 may include various input/output circuitry and function as an interface that transfers instructions or data input from a user or another external device to the other element(s) of the electronic device 101. Further, the input/output interface 150 may output the instructions or data received from the other element(s) of the electronic device 101 to the user or an external electronic device.

The display 160 may include a liquid crystal display (LCD), a light emitting diode (LED) display, an organic LED (OLED) display, a micro electro mechanical system (MEMS) display, an electronic paper display, or the like, but is not limited thereto. The display 160 may display various types of content, such as text, images, videos, icons, or symbols. The display 160 may display a web page.

The display 160 may include a touch screen, which receives a touch, a gesture, proximity, a hovering input, etc., using an electronic pen or a user's body part (e.g., a finger).

The communication interface 170 may include various communication circuitry and establish communication between the electronic device 101 and a first external electronic device 102, a second external electronic device 104, and/or a server 106. For example, the communication interface 170 communicates with the first external electronic device 102, the second external electronic device 104, and/or the server 106 through the network 162 using wireless communication or wired communication or via a short-range communication 164. For example, the wireless communication conforms to a cellular communication protocol including at least one of LTE, LTE-advanced (LTE-A), code division multiple access (CDMA), WCDMA, universal mobile telecommunication system (UMTS), wireless broadband (WiBro), and GSM.

The wired communication may include at least one of a universal serial bus (USB), a high definition multimedia interface (HDMI), a recommended standard 232 (RS-232), and a plain old telephone service (POTS).

The network 162 may include a telecommunications network, a computer network such as local area network (LAN) or wide area network (WAN), the Internet, and a telephone network.

The electronic device 101 may provide an LTE service in a single radio environment by use of at least one module functionally or physically separated from the processor 120.

Each of the first and second external electronic devices 102 and 104 may be the same or different type of device as the electronic device 101.

The server 106 may include a group of one or more servers.

All or some of the operations to be executed by the electronic device 101 may be executed by the first external electronic device 102, the second external electronic device 104, and/or the server 106. For example, when the electronic device 101 performs a certain function or service (automatically or by request), the electronic device 101 may request some functions that are associated therewith from the first external electronic device 102, the second external electronic device 104, and/or the server 106, instead of or in addition to executing the function or service itself. The first external electronic device 102, the second external electronic device 104, and/or the server 106 may execute the requested functions or additional functions, and may transmit the results to the electronic device 101. The electronic device 101 may provide the requested functions or services by processing the received results. For example, a cloud computing technique, a distributed computing technique, or a client-server computing technique may be used.

According to various example embodiments, the processor 210 may determine a current mode of the electronic device based on a result detected in at least one of the above-described sensor modules according to an example embodiment of the present disclosure. According to an example embodiment, the processor 210 may generate a control signal based on the determined current mode, and may adjust an operating frequency band of a conductive member of the electronic device in a low band by controlling a tunable circuit using the corresponding control signal.

Figure 2:
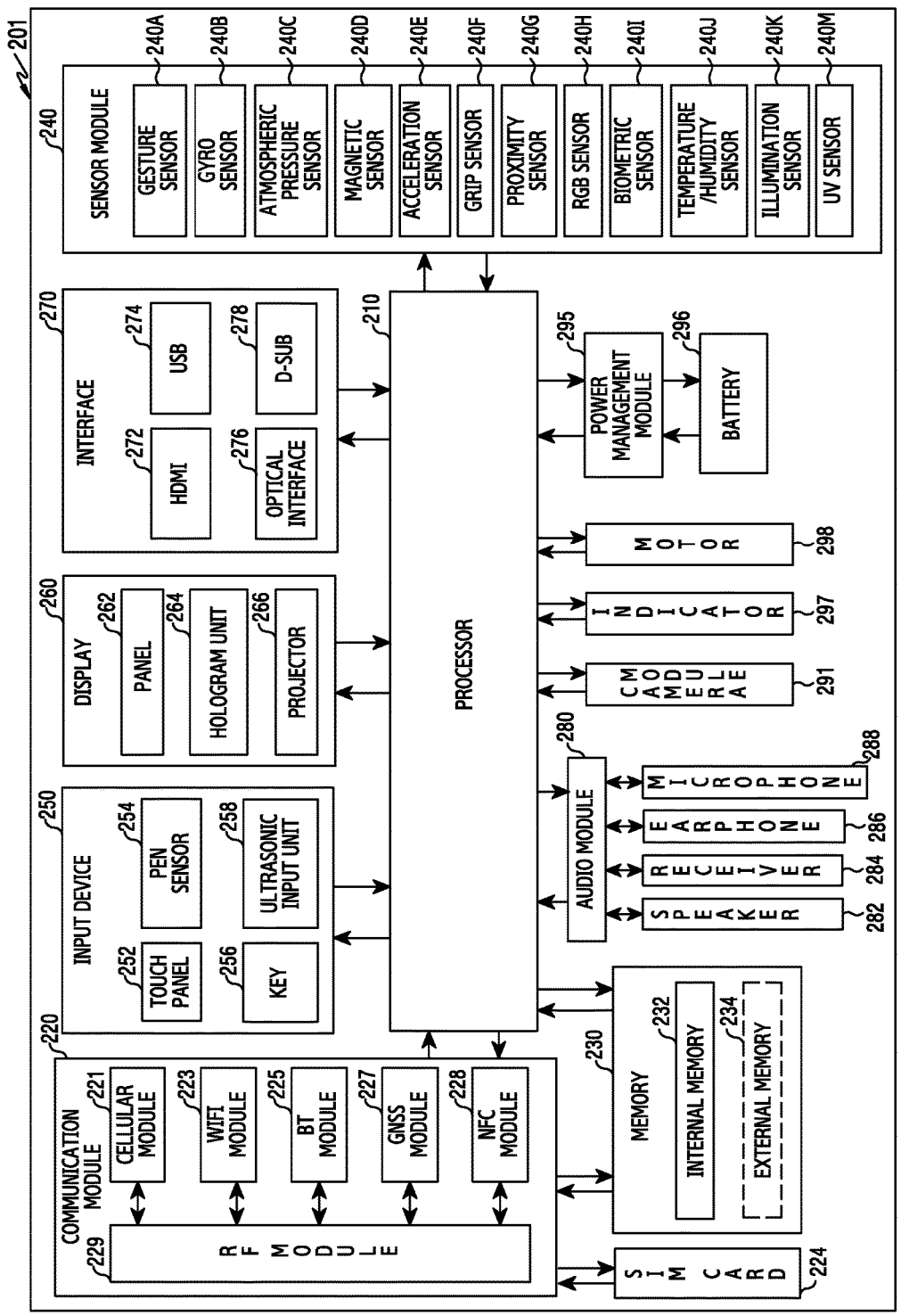
FIG. 2 is a block diagram illustrating an example electronic device according to various example embodiments of the present disclosure.

FIG. 2 is a diagram illustrating an example electronic device, according to an example embodiment of the present disclosure.

Referring to FIG. 2, the electronic device 201 includes a processor (e.g., including processing circuitry) 210, a communication module (e.g., including communication circuitry) 220, a subscriber identification module (SIM) card 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The processor 210 may include various processing circuitry and control a plurality of hardware or software elements connected to the processor 210 by driving an OS or an application program. The processor 210 may process a variety of data, including multimedia data, perform arithmetic operations, may be implemented with a system on chip (SoC), and may further include a GPU.

The communication module 220 may include various communication circuitry and perform data transmission/reception between an external electronic device and/or a server, which may be connected with the electronic device through a network. The communication module 220 may include various communication circuitry, such as, for example, and without limitation, at least one of a cellular module 221, a Wi-Fi module 223, a Bluetooth® (BT) module 225, a global navigation satellite system (GNSS) or GPS module 227, a near field communication (NFC) module 228, and a radio frequency (RF) module 229.

The cellular module 221 may provide a voice call, a video call, a text service, or an Internet service through a communication network, such as LTE, LTE-A, CDMA, WCDMA, UMTS, WiBro, or GSM. In addition, the cellular module 221 may identify and authenticate the electronic device within the communication network by using the SIM card 224. The cellular module 221 may perform at least some of the functions that can be provided by the processor 210. For example, the cellular module 221 may perform multimedia control functions.

The cellular module 221 may include a CP. Further, the cellular module 221 may be implemented, for example, with an SoC.

Although elements, such as the cellular module 221, the memory 230, and the power management module 295 are illustrated as separate elements with respect to the processor 210 in FIG. 2, the processor 210 may also be implemented such that at least one part of the aforementioned elements, e.g., the cellular module 221, is included in the processor 210.

The processor 210 or the cellular module 221 may load an instruction or data, which is received from each non-volatile memory connected thereto or at least one of different elements, to a volatile memory and processes the instruction or data. In addition, the processor 210 or the cellular module 221 may store data, which is received from at least one of different elements or generated by at least one of different elements, into a non-volatile memory.

Each of the Wi-Fi module 223, the BT module 225, the GNSS module 227, and the NFC module 228 may include a processor for processing data transmitted/received through a corresponding module. Although the cellular module 221, the Wi-Fi module 223, the BT module 225, the GNSS module 227, and the NFC module 228 are illustrated in FIG. 2 as separate blocks, at least two of the cellular module 221, the Wi-Fi module 223, the BT module 225, the GNSS module 227, and the NFC module 228 may be included in one integrated chip (IC) or IC package. For example, at least some of processors corresponding to the cellular module 221, the Wi-Fi module 223, the BT module 225, the GNSS module 227, and the NFC module 228, such as a communication processor corresponding to the cellular module 221 and a Wi-Fi processor corresponding to the Wi-Fi module 223, may be implemented with an SoC.

The RF module 229 may transmit/receive data, such as an RF signal, and may include a transceiver, a power amp module (PAM), a frequency filter, or a low noise amplifier (LNA). In addition, the RF module 229 may further include a component for transmitting/receiving a radio wave on a free space in wireless communication, e.g., a conductor or a conducting wire. The cellular module 221, the Wi-Fi module 223, the BT module 225, the GNSS module 227, and the NFC module 228 may share the RF module 229, or at least one of these modules may transmit/receive an RF signal via a separate RF module.

The SIM card 224 may be inserted into a slot formed in the electronic device. The SIM card 224 includes unique identification information, such as an integrated circuit card identifier (ICCID) or subscriber information, such as an international mobile subscriber identity (IMSI).

The memory 230 includes an internal memory 232 and/or an external memory 234.

The internal memory 232 may include at least one of a volatile memory, such as a dynamic random access memory (DRAM), a static RAM (SRAM), or a synchronous dynamic RAM (SDRAM) or a non-volatile memory, such as a one-time programmable read only memory (OTPROM), a programmable ROM (PROM), an erasable and programmable ROM (EPROM), an electrically erasable and programmable ROM (EEPROM), a mask ROM, a flash ROM, a not and (NAND) flash memory, and a not or (NOR) flash memory. The internal memory 232 may be a solid state drive (SSD).

The external memory 234 may include a flash drive, a compact flash (CF), secure digital (SD), micro-SD, mini-SD, extreme digital (xD), and a memory stick, and may be operatively coupled to the electronic device via various interfaces.

The electronic device may also include a storage unit (or a storage medium), such as a hard drive.

The sensor module 240 may measure a physical quantity or detect an operation state of the electronic device, and convert the measured or detected information into an electrical signal. The sensor module 240 includes a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H, e.g., a red, green, blue (RGB) sensor, a biometric sensor 240I, a temperature/humidity sensor 240J, an illumination sensor 240K, and an ultraviolet (UV) sensor 240M.

Additionally or alternatively, the sensor module 240 may include other sensors, e.g., an E-node sensor, an electromyography (EMG) sensor, an electroencephalogram (EEG) sensor, an electrocardiogram (ECG) sensor, and/or a fingerprint sensor.

The sensor module 240 may further include a control circuit for controlling at least one or more sensors included therein.

The input device 250 may include various input circuitry, such as, for example, and without limitation, at least one of a touch panel 252, a (digital) pen sensor 254, a key 256, and an ultrasonic input unit 258.

The touch panel 252 may recognize a touch input by using at least one of an electrostatic type configuration, a pressure-sensitive type configuration, and an ultrasonic type configuration. The touch panel 252 may further include a control circuit. When the touch panel is of the electrostatic type, both physical contact recognition and proximity recognition are possible. The touch panel 252 may further include a tactile layer, which provides the user with a tactile reaction.

The (digital) pen sensor 254 may include a recognition sheet which can be a part of the touch panel or can be separately implemented from the touch panel. The (digital) pen sensor 254 may be implemented using the same or similar method of receiving a touch input of a user or using an additional recognition sheet.

The key 256 may include a physical button, an optical key, or a keypad.

The ultrasonic input device 258 may detect ultrasonic waves generated by an input tool through a microphone 288, and may confirm data corresponding to the detected ultrasonic waves.

The ultrasonic input unit 258 may detect a reflected sound wave through the microphone 288 and perform radio recognition. For example, an ultrasonic signal, which may be generated by using a pen, may be reflected off an object and detected by the microphone 288.

The electronic device may use the communication module 220 to receive a user input from an external device, such as a computer or a server connected thereto.

The display 260 includes a panel 262, a hologram device 264, and a projector 266.

The panel 262 may be an LCD or an AM-OLED and may be implemented in a flexible, transparent, or wearable manner. Alternatively, the panel 262 may be constructed as one module with the touch panel 252.

The hologram device 264 uses an interference of light and displays a stereoscopic image in the air.

The projector 266 displays an image by projecting a light beam onto a screen, which may be located inside or outside the electronic device.

The display 260 may further include a control circuit for controlling the panel 262, the hologram device 264, and/or the projector 266.

The interface 270 may include various interface circuitry, such as, for example, and without limitation, at least one of an HDMI 272, a USB 274, an optical communication interface 276, and a d-subminiature (D-sub) 278. The interface 270 may include a mobile high-definition link (MHL), SD/multi-media card (MMC), and/or infrared data association (IrDA).

The audio module 280 bilaterally converts a sound and an electric signal. The audio module 280 converts sound information, which is input or output through a speaker 282, a receiver 284, an earphone 286, and/or the microphone 288.

The speaker 282 may output a signal of an audible frequency band and a signal of an ultrasonic frequency band. Reflected waves of an ultrasonic signal emitted from the speaker 282 and a signal of an external audible frequency band may be received.

The camera module 291 captures an image and/or a video, and may include one or more image sensors, such as a front sensor or a rear sensor, a lens, an image signal processor (ISP), or a flash, such as an LED or a xenon lamp. Alternatively, the electronic device may include two or more camera modules.

The power management module 295 manages power of the electronic device. The power management module 295 may include a power management integrated circuit (PMIC), a charger IC, and/or a battery gauge.

The PMIC may be included in an IC or an SoC semiconductor and may use a wired charging and/or a wireless charging method. The charger IC may charge the battery 296 and may prevent an over-voltage or over-current flow.

Different types of wireless charging may include magnetic resonance type, magnetic induction type, and electromagnetic type. An additional circuit for the wireless charging, such as a coil loop, a resonant circuit, and/or a rectifier may be added.

The battery gauge may measure a residual quantity of the battery 296 and a voltage, current, and temperature during charging. The battery 296 stores or generates electricity and supplies power to the electronic device by using the stored or generated electricity. The battery 296 may include a rechargeable battery or a solar battery.

The indicator 297 indicates a specific state, such as a booting state, a message, or a charging state of the electronic device or a part thereof, such as the processor 210.

The motor 298 converts an electric signal into a mechanical vibration.

Alternatively, the electronic device includes a processing unit, such as a GPU, for supporting mobile TV, which processes media data according to a protocol, e.g., digital multimedia broadcasting (DMB), digital video broadcasting (DVB), and/or media flow.

Each of the aforementioned elements of the electronic device may include one or more components, and the names thereof may vary depending on a type of the electronic device. Some of the elements illustrated in FIG. 2 may be omitted, and/or additional elements may be included therein. In addition, some of the elements of the electronic device may be combined and constructed as one entity, so as to equally perform functions of corresponding elements before combination.

At least some parts of the electronic device, such as modules or functions thereof, or operations, may be implemented with an instruction stored in a non-transitory computer-readable storage media. The instruction may be executed by the processor 210, to perform a function corresponding to the instruction. The non-transitory computer-readable storage media may be the memory 230. At least some parts of the programming module may be executed by the processor 210. At least some parts of the programming module may include modules, programs, routines, and a set of instructions for performing one or more functions.

Figure 3:
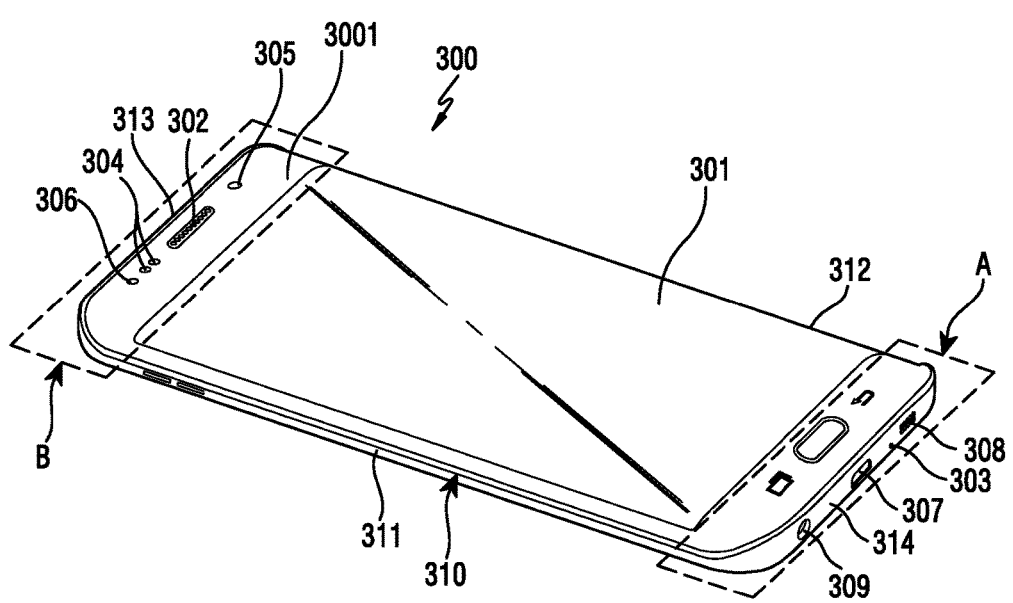
FIG. 3 is a perspective view of an electronic device according to various example embodiments of the present disclosure.

FIG. 3 is a perspective view of an example electronic device 300 according to various example embodiments of the present disclosure.

Referring to FIG. 3, a display 301 may be installed on a front surface 3001 (for example, a first surface) of the electronic device 300. A speaker 302 may be installed at one side of the display 301 to output a voice received from the other person. A microphone 303 may be installed at the other side of the display 301 to transmit a voice of a user of the electronic device to the other person. According to an example embodiment, the display 301 may include a touch screen including a touch sensor. According to one embodiment, the display 301 may include a pressure reaction type touch screen including a touch sensor and a force sensor which reacts to a touch pressure.

According to an example embodiment, the electronic device 300 may include components installed on the periphery of the speaker 302 to perform various functions of the electronic device 300. According to an example embodiment, the components may include at least one sensor module 304. The sensor module 304 may include, for example, at least one of an illuminance sensor (for example, a light sensor), a proximity sensor, an infrared sensor, an ultrasonic sensor, and an iris scan sensor. According to an example embodiment, the components may include a camera 305. According to an example embodiment, the components may include an indicator 306 (for example, an LED indicator) for notifying the user of state information of the electronic device 300.

According to various example embodiments, an interface connector port 307 for accommodating an external interface connector (for example, a B type USB connector, a C type USB connector, or the like), and an ear jack hole 309 for accommodating an ear jack may be included at one side of the microphone 303. According to an example embodiment, another speaker 308 may be disposed at the other side of the microphone 303.

According to various example embodiments, the electronic device 300 may include a housing made of metal (for example, a metal bezel). According to an example embodiment, at least a part of the housing 310 may be disposed along the border of the electronic device 300, and may extend to at least a region of a rear surface (for example, a second surface) of the electronic device 300 extending from the border. According to an example embodiment, the housing 310 may be defined by a thickness of a side surface of the electronic device formed along the border of the electronic device 300, and may be formed in a loop shape (for example, a loop shape having a part opened or a completely closed loop shape). However, this should not be considered as limiting, and the housing 310 may be formed by at least a part of the thickness of the electronic device 300. According to one embodiment, the housing 310 may be disposed only on at least a region of the border of the electronic device 300. According to one embodiment, the housing 310 disposed along the border of the electronic device 300 may include a conductive member to be used as an antenna emitter.

According to various example embodiments, the housing 310 may be formed along the border in the loop shape, and may be disposed in such a manner that it contributes to an entirety or a part of the thickness of the electronic device 300. According to an example embodiment, the housing 310 may include a first conductive member 311, a second conductive member 312, a third conductive member 313, and a fourth conductive member 314 formed on the left, right, top and bottom, respectively, when viewed from the front surface of the electronic device 300. According to an example embodiment, at least one of the first conductive member 311 to the fourth conductive member 314 may be used as an antenna emitter through feeding and grounding. For example, the antenna emitter may include the fourth conductive member 314, at least a region of the first conductive member 311 extending from one end of the fourth conductive member 314, and at least a region of the second conductive member 312 extending from the other end of the fourth conductive member 314. According to an example embodiment, the antenna emitter may be used as a multi-band antenna emitter operating in at least one frequency band (A region of FIG. 3). According to an example embodiment, the electronic device 300 may include another antenna emitter using the third conductive member 313 and at least parts of the first conductive member 311 and the second conductive member 312 (B region of FIG. 3).

According to various example embodiments, the fourth conductive member 314 and the at least regions of the first conductive member 314 and the second conductive member 312 may include a multi-band antenna emitter operating in a low band (for example, an operating frequency band ranging from 700 MHz to 900 MHz) and a mid band (for example, an operating frequency band ranging from 1700 MHz to 2100 MHz). According to an example embodiment, the fourth conductive member 314 and the at least regions of the first conductive member 311 and the second conductive member 312 may include a multi-band antenna emitter operating in a low band and a high band (for example, an operating frequency band ranging from 2300 MHz to 2700 MHz).

According to various example embodiments, the electronic device may include an antenna emitter having an electric length which is fed with power in the fourth conductive member 314 and is grounded to regions of the first conductive member 311 and the second conductive member 312. According to an example embodiment, the electronic device may smoothly shift an operating frequency band in a low band by controlling a tunable circuit which is interposed in the electric length of the antenna emitter, without changing a ground position of a ground. This configuration of the antenna emitter may contribute to slimness of the electronic device even when the operating frequency band of the low band is shifted, and may not influence the operating frequency operating in the mid band and/or high band (a phenomenon that an operating frequency band is arbitrarily shifted). Therefore, degradation of performance of the antenna emitter can be prevented and/or reduced in advance.

Figure 4:
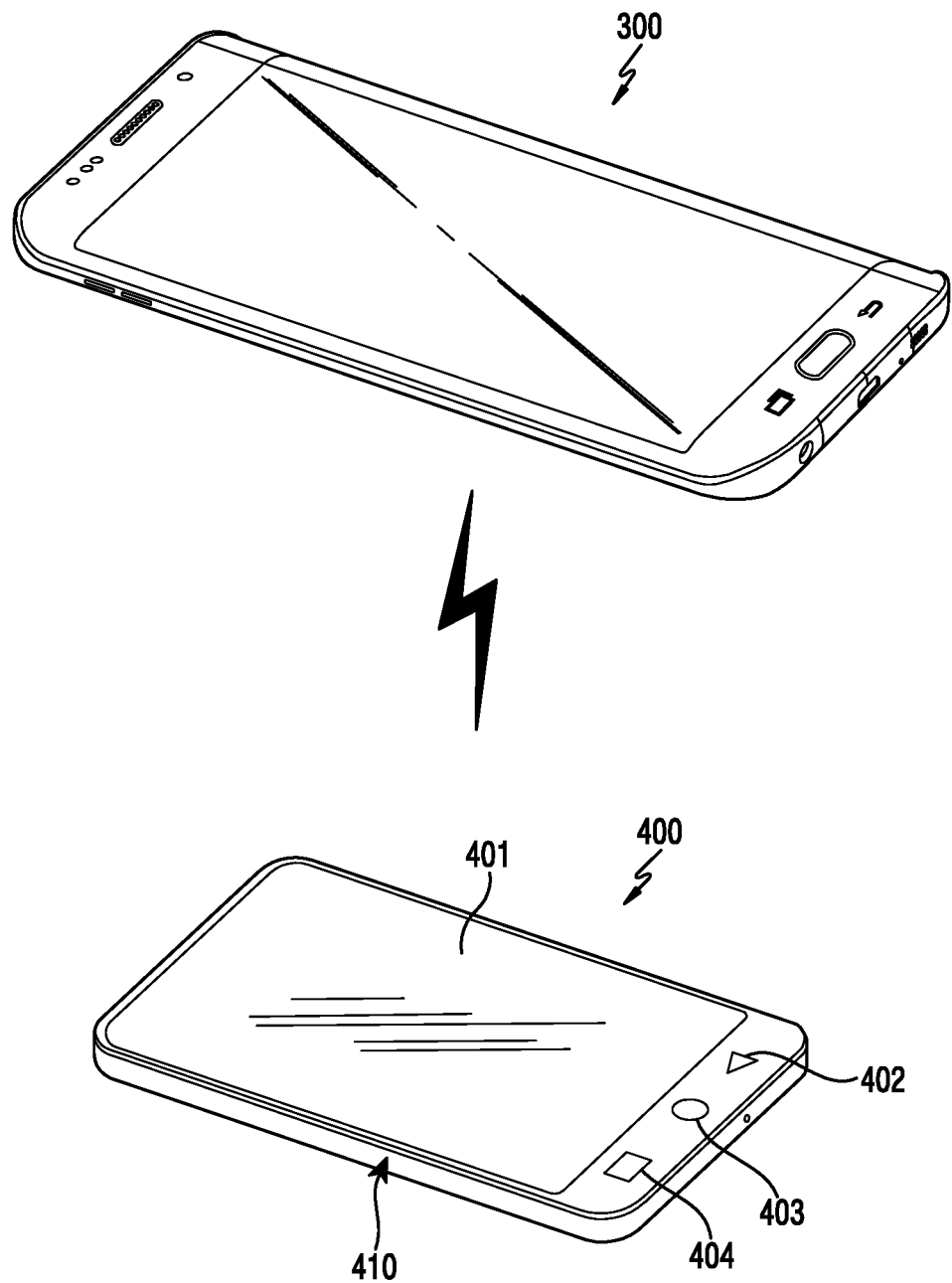
FIG. 4 is a perspective view of an electronic device according to various example embodiments of the present disclosure.

FIG. 4 is a perspective view of an example electronic device according to various example embodiments of the present disclosure.

The electronic device 400 of FIG. 4 may be similar to the electronic device 300 of FIG. 3 or may include other example embodiments of the electronic device.

Referring to FIG. 4, the electronic device 400 may be functionally connected with the electronic device 300 of FIG. 3. According to an example embodiment, information related to the functions of another electronic device 300 may be output through the electronic device 400. Information related to the functions of the electronic device 400 may be output through the electronic device 300. According to an example embodiment, the electronic device 400 may be functionally connected with another electronic device in a wireless communication (for example, Bluetooth communication or RF communication) method. According to an example embodiment, the electronic device 400 may be smaller than another electronic device 300 (for example, an electronic device of a card type). According to an example embodiment, the electronic device 400 may be an electronic device that includes additional functions subordinate to another electronic device 300 and used. According to one embodiment, the electronic device 400 may be used independently.

According to various example embodiments, the electronic device 400 may include a display 401 which is disposed on a region occupying substantially most of the front surface thereof. According to an example embodiment, the electronic device 400 may include at least one touch region 402, 403, 404 formed at one side region of the display 401. According to an example embodiment, the plurality of touch regions 402, 403, 404 may be arranged on a separate region from the display 401. According to an example embodiment, the at least one touch region 402, 403, 404 may be configured to recognize a touch by means of a touch pad disposed in the electronic device 400. However, this should not be considered as limiting. The at least one touch region may be arranged in a display region disposed on the most of regions of the front surface of the electronic device. According to an example embodiment, although not shown, the electronic device 400 may include a speaker, a microphone, various electronic components, and a camera disposed on regions other than the region of the display and having similar or same functions to or as those of the configuration of FIG. 3. According to an example embodiment, at least one of the electronic components (for example, a camera, a fingerprint recognition sensor, or the like) may be disposed on a region overlapping the display in the electronic device to perform its function through the display.

According to various embodiments, the electronic device 400 may include a housing 410 formed of metal and having the same or similar configuration as the housing 310 of FIG. 3. According to an example embodiment, the housing 410 may have a conductive member formed on at least a region thereof. According to an example embodiment, the conductive member may be used as an antenna emitter operating in at least one operating frequency band. According to an example embodiment, the electronic device may include an antenna emitter capable of easily shifting an operating frequency band without physically changing a ground position in a low band even when the electronic device has a relatively miniaturized and slim shape such as, for example, a card type.

Figure 5:
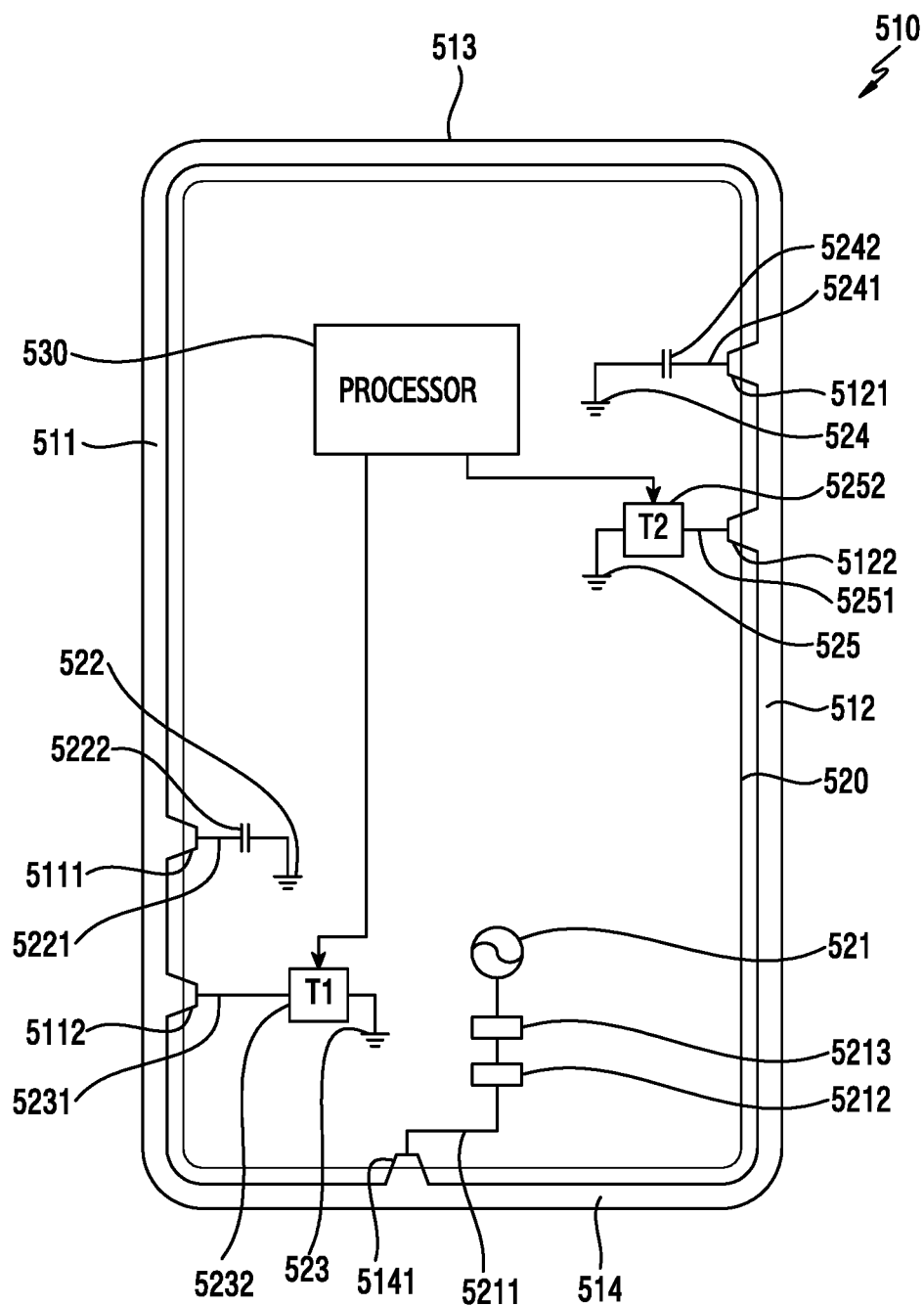
FIG. 5 is a diagram illustrating an example configuration of an antenna according to various example embodiments of the present disclosure.

FIG. 5 is a diagram illustrating an example configuration of an antenna according to various example embodiments of the present disclosure.

The housing 510 of FIG. 5 may be similar to the housing 310 of FIG. 3 or the housing 410 of FIG. 4, or may include other embodiments of the housing.

Referring to FIG. 5, the housing 510 may include a left conductive member 511, a right conductive member 512, an upper conductive member 513, and a lower conductive member 514 when viewed from the front surface. The respective conductive members 511, 512, 513, 514 may be integrally formed with one another so as to have a substantially loop shape.

According to various example embodiments, the lower conductive member 514 may include a feeding piece 5141 protruding toward the inside of the housing 510. According to an example embodiment, the feeding piece 5141 may be integrally formed with the lower conductive member 514. According to an example embodiment, the feeding piece 5141 may be electrically connected with a feeder 521 (for example, a communication circuit) of a substrate (for example, a printed circuit board (PCB)) 520. According to an example embodiment, the feeding piece 5141 of the lower conductive member 514 may be electrically connected with the feeder 521 of the substrate 520 simply by installing the substrate 520 in the electronic device, or may be electrically connected by a separate electric connection member (for example, a C clip or the like).

According to various example embodiments, a first electric path (for example, a distribution line) 5211 may be formed from a region (for example, a feeding pad) electrically connected with the feeding piece 5141 to the feeder 521 on the substrate 520. According to an example embodiment, since the substrate 520 is configured to be electrically in direct contact with the housing 510 forming the exterior of the electronic device, an electric shock prevention circuit 5212 for preventing an electric shock and discharging static electricity (electro-static discharge (ESD)), and a matching circuit 5213 for impedance matching with an antenna emitter may further be included on the first electric path 5211.

According to various example embodiments, the left conductive member 511 may include a first ground piece 5111 integrally formed with at least a region of the left conductive member 511. According to an example embodiment, the first ground piece 5111 may be electrically connected to a first ground 522 of the substrate (PCB) 520. According to an example embodiment, the first ground piece 5111 of the left conductive member 511 may be electrically connected to the first ground 522 of the substrate 520 simply by installing the substrate 520 in the electronic device, or may be electrically connected by a separate electric connection member (for example, a C clip or the like).

According to various example embodiments, a second electric path (for example, a distribution line) 5221 may be formed from a region (for example, a ground pad) electrically connected with the first ground piece 5111 to the first ground 522 on the substrate 520. According to an example embodiment, since the substrate 520 is configured to be electrically in direct contact with the housing 510 forming the exterior of the electronic device, an electric shock prevention circuit 5222 (for example, a capacitor) for preventing an electric shock and discharging static electricity (ESD) may further be included on the second electric path 5221.

According to various example embodiments, the left conductive member 511 may include a first connection piece 5112 integrally formed with at least a region of the left conductive member 511. According to an example embodiment, the first connection piece 5112 may be disposed between the feeding piece 5141 and the first ground piece 5111. According to an example embodiment, the first connection piece 5112 may be electrically connected to a region (for example, a connection pad) electrically connected with a second ground 523 of the substrate (PCB) 520 through a third electric path 5231 (for example, a distribution line). According to an example embodiment, the first connection piece 5112 of the left conductive member 511 may be electrically connected with the second ground 523 of the substrate 520 simply by installing the substrate 520 in the electronic device, or may be electrically connected with the second ground 523 by a separate electric connection member (for example, a C clip or the like). According to an example embodiment, a first tunable circuit (T1) 5232 may be interposed on the third electric path 5231. According to an example embodiment, the first tunable circuit 5232 may be controlled by a processor (e.g., including processing circuitry) 530 of the electronic device to adjust an electric length of an antenna emitter including the lower conductive member 514 and a part of the left conductive member 511 and a part of the right conductive member 512.

According to various example embodiments, the right conductive member 512 may include a second ground piece 5121 integrally formed with at least a region of the right conductive member 512. According to an example embodiment, the second ground piece 5121 may be electrically connected to a third ground 524 of the substrate (PCB) 520. According to an example embodiment, the second ground piece 5121 of the right conductive member 512 may be electrically connected to the third ground 524 of the substrate 520 simply by installing the substrate 520 in the electronic device, or may be electrically connected by a separate electric connection member (for example, a C clip or the like).

According to various example embodiments, a fourth electric path 5241 (for example, a distribution line) may be formed from a region (for example, a ground pad) electrically connected with the second ground piece 5121 to the third ground 524 on the substrate 520. According to an example embodiment, since the substrate 520 is configured to be electrically in direct contact with the housing 510 forming the exterior of the electronic device, an electric shock prevention circuit 5242 (for example, a capacitor) for preventing an electric shock and discharging static electricity (ESD) may further be included on the fourth electric path 5241.

According to various example embodiments, the right conductive member 512 may include a second connection piece 5122 integrally formed with at least a region of the right conductive member 512. According to an example embodiment, the second connection piece 5122 may be disposed between the feeding piece 5141 and the second ground piece 5121. According to an example embodiment, the second connection piece 5122 may be electrically connected to a region (for example, a connection pad) electrically connected with a fourth ground 525 of the substrate (PCB) 520 through a fifth electric path 5251 (for example, a distribution line). According to an example embodiment, the second connection piece 5122 of the right conductive member 512 may be electrically connected with the fourth ground 525 of the substrate 520 simply by installing the substrate 520 in the electronic device, or may be electrically connected with the fourth ground 525 by a separate electric connection member (for example, a C clip or the like). According to an example embodiment, a second tunable circuit (T2) 5252 may be interposed on the fifth electric path 5251. According to an example embodiment, the second tunable circuit 5252 may be controlled by the processor 530 of the electronic device to adjust an electric length of an antenna emitter including the lower conductive member 514 and a part of the left conductive member 511 and a part of the right conductive member 512 along with the first tunable circuit 5232.

According to various example embodiments, the processor 530 of the electronic device may detect state information (for example, region information, channel information, voice/data communication information of the electronic device, grip information, proximity information, or the like) of the electronic device through at least one sensor, may determine a current mode based on the detected state information, and may control the above-described first tunable circuit (T1) 5232 and/or second tunable circuit (T2) 5252 based on the determined mode to shift an operating frequency band of the antenna emitter in a low band. For example, the processor 530 may control, through the first tunable circuit 5232 and/or the second tunable circuit 5252, the antenna emitter using the lower conductive member 514 and a part of the left conductive member 511 and a part of the right conductive member 512 to selectively operate in various operating frequency bands (for example, 700 MHz, 800 MHz, 850 MHz, or 900 MHz) of low bands.

According to various example embodiments, the feeding piece 5141, the first ground piece 5111, and the second ground piece 5121 may be disposed on their respective corresponding conductive members, but are not limited thereto. For example, when the first connection piece 5112 is disposed between the feeding piece 5141 and the first ground piece 5111, and the second connection piece 5122 is disposed between the feeding piece 5141 and the second ground piece 5121, the feeding piece 5141, the first ground piece 5111, and the second ground piece 5121 may be disposed on any conductive member. In addition, in this example, the electronic device is illustrated as including a pair of tunable circuits having the first tunable circuit 5132 and the second tunable circuit 5252 and is described, but one tunable circuit or three or more tunable circuits may be disposed on corresponding positions. According to an example embodiment, although the first, second, third, and fourth grounds have been described for convenience of explanation, the corresponding grounds may include a common ground region of the substrate.

Hereinafter, a tunable circuit will be described in greater detail with reference to FIG. 6A.

Figure 6A:
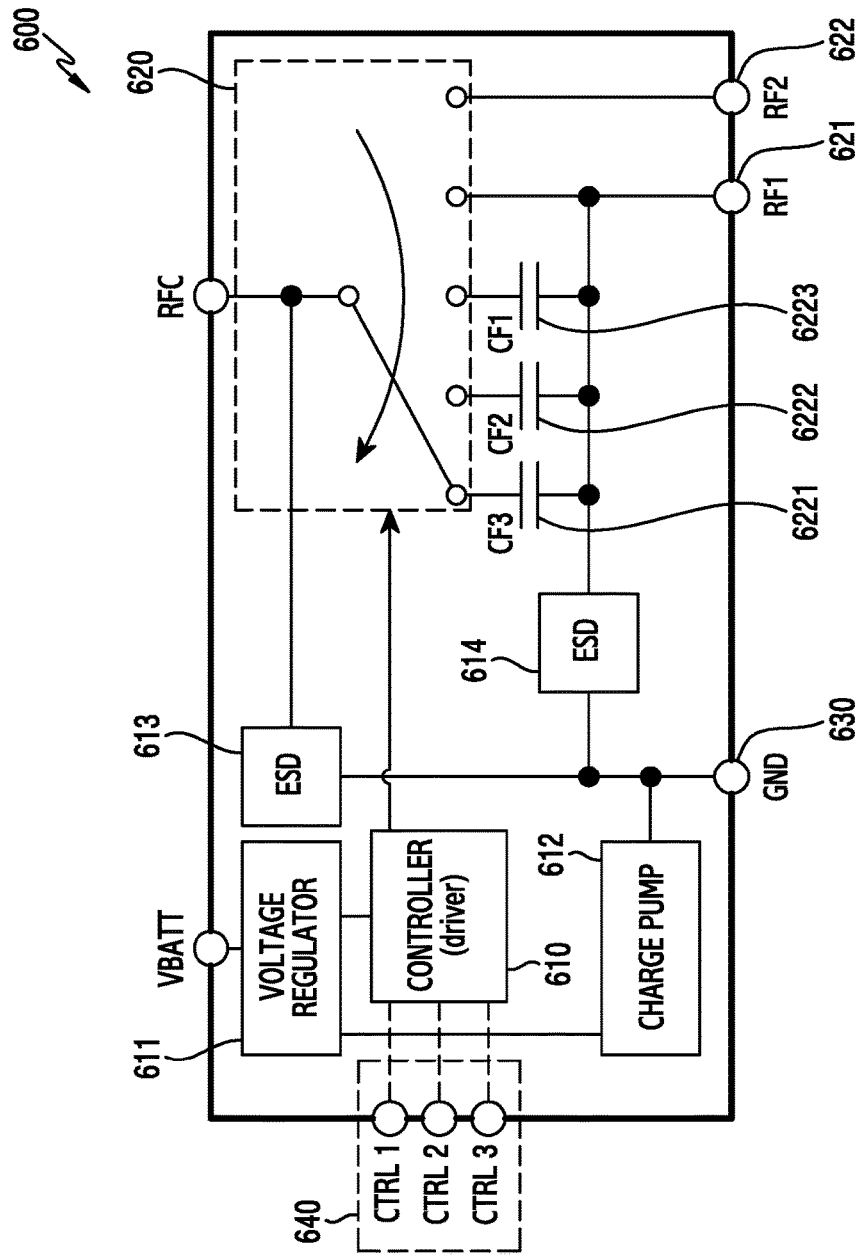
FIG. 6A is an equivalent circuit diagram of an example tunable circuit according to various example embodiments of the present disclosure.

FIG. 6A is an equivalent circuit diagram illustrating an example tunable circuit according to various example embodiments of the present disclosure. FIG. 6B is a table illustrating example switching states based ion control signals of the tunable circuit according to various example embodiments of the present disclosure.

The tunable circuit 600 of FIG. 6A may be similar to the tunable circuits 5232 and 5252 of FIG. 5 or may include other embodiments of the tunable circuit.

Referring to FIG. 6A, the tunable circuit 600 may include a controller (e.g., including processing circuitry) 610 (for example, a driver), a control signal receiver (e.g., including receiving circuitry) 640 for receiving a control signal generated from a main controller (for example, an AP 720 or an FPGA 710 of FIG. 7) of the electronic device, and a switching circuit 620 which is controlled by the controller 610 based on a control signal received from the control signal receiver 640.

According to an example embodiment, the switching circuit 620 may be interposed in an electric path between a conductive member (for example, the conductive members 514, 511, 512 of FIG. 5) of the electronic device and a ground 630 electrically connected to the conductive member, and may be controlled by the controller 610 to short or open the electric path. According to an example embodiment, the switching circuit 620 may include a first port 621 and a second port 622 which are disposed between a region (RFC) connected with the conductive member and the ground 630 (for example, a ground region electrically connected with a ground of a substrate). According to an example embodiment, each of the first port 621 and the second port 622 may be electrically connected with the ground 630.

According to various example embodiments, a plurality of unit ports 6221, 6222, 6223 having element values different from one another may be arranged in an electric path between the first port 621 and the ground 630. According to an example embodiment, when the first port 621 is selected by the switching circuit 620 under the control of the controller 610, any one of the plurality of unit ports 6221, 6222, 6623 described above may be selected. According to an example embodiment, each of the plurality of unit ports 6221, 6222, 6223 may include at least one capacitor (CF3, CF2, CF1, respectively) having a different capacitance value. According to an example embodiment, the second port 622 may be directly and electrically connected with the ground without being connected with a separate element having a specific value.

According to various example embodiments, the switching circuit 620 may be controlled by the controller 610 to electrically connect the conductive member and the ground 630 (short) or electrically disconnect the conductive member and the ground 630 (open), or interpose an element having a specific value in the electric path between the conductive member and the ground 630 and electrically connect the conductive member and the ground 630.

According to various example embodiments, the controller 610 may be configured to receive a constant voltage through a voltage regulator 611, and the voltage regulator 611 may be grounded to the ground 630 through a charge pump 612 (for example, a DC-to-DC converter). According to an example embodiment, at least one electric shock prevention element 613, 614 may further be included in the electric path between the first port 621 and the ground 630 and the electric path between the conductive member (RFC region) and the ground 630. According to one embodiment, the electric shock prevention element 613, 614 may include a capacitor.

Referring to FIG. 6B, the tunable circuit 600 may control the switching circuit 620 based on a control signal received through the control signal receiver 640, and may be switched in various methods. According to an example embodiment, when the tunable circuit 600 receives a control signal (0, 0, 0) in state 1, the tunable circuit 600 may open the first port and the second port. According to an example embodiment, when the tunable circuit 600 receives a control signal (0, 0, 1) in state 2, the tunable circuit 600 may open the first port and short the second port. According to an example embodiment, when the tunable circuit 600 receives a control signal (0, 1, 0) in state 3, the tunable circuit 600 may connect the first port to a unit port of 6 pF and open the second port. According to an example embodiment, when the tunable circuit 600 receives a control signal (0, 1, 1) in state 4, the tunable circuit 600 may connect the first port to a unit port of 8 pF and open the second port. According to an example embodiment, when the tunable circuit 600 receives a control signal (1, 0, 0) in state 5, the tunable circuit 600 may connect the first port to a unit port of 10 pF and open the second port. According to an example embodiment, when the tunable circuit 600 receives a control signal (1, 0, 1) in state 6, the tunable circuit 600 may connect the first port to a unit port of 12 pF and open the second port. According to an example embodiment, when the tunable circuit 600 receives a control signal (1, 1, 0) in state 7, the tunable circuit 600 may connect the first port to a unit port of 14 pF and open the second port.

According to various example embodiments, the tunable circuit 600 may control the switching circuit 620 to short the conductive member to the ground 630 or open the conductive member, or interpose a capacitor having a specific capacitance value through one of the plurality of unit ports 6221, 6222, 6223, thereby adjusting an electric length of the conductive member used as an antenna emitter.

Figure 7:
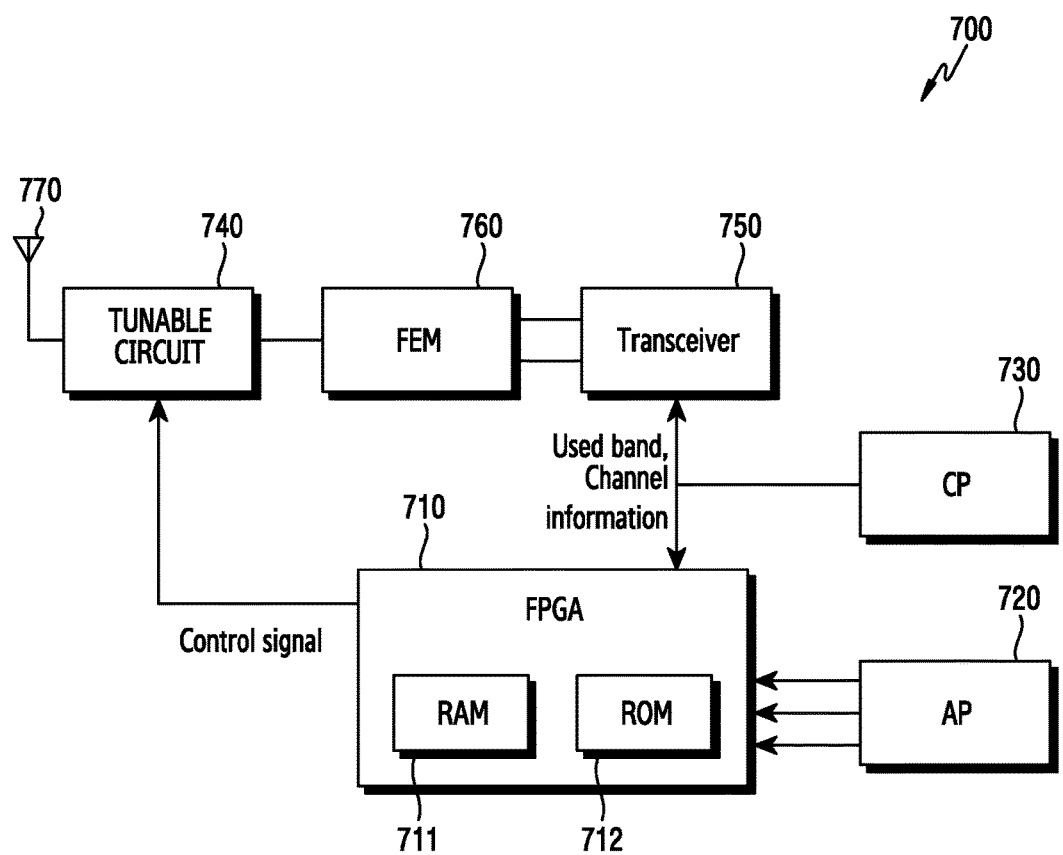
FIG. 7 is a diagram illustrating an example configuration for controlling a tunable circuit of an electronic device according to various example embodiments of the present disclosure.

FIG. 7 is a diagram illustrating an example configuration for controlling a tunable circuit of an electronic device according to various example embodiments of the present disclosure.

The electronic device 700 of FIG. 7 may be similar to the electronic device 300 of FIG. 3 or the electronic device 400 of FIG. 4 or may include other embodiments of the electronic device.

Referring to FIG. 7, the electronic device may include an application processor (AP) (e.g., including processing circuitry) 720, a communication processor (CP) (e.g., including processing circuitry) 730, a field programmable gate array (FPGA) 710 including a memory 711, 712, a transceiver 750, a front end module (FEM) 760, and at least one tunable circuit 740 electrically connected with an antenna emitter 770 (for example, a conductive member).

According to an example embodiment, the AP 720 may include various processing circuitry and control a plurality of hardware or software elements connected to the AP 720 by driving an operating system or an application program, and may process and calculate various data including multimedia data. According to an example embodiment, the AP 720 may be implemented by using a system on chip (SoC), for example. According to an example embodiment, the AP may further include a graphic processing unit (GPU) (not shown). According to an example embodiment, the CP 730 may assist the AP 720 in controlling a communication-related function such as being responsible for communication processing and setting an access when performing network communication. According to an example embodiment, the CP 730 may control to transmit and receive communication signals through the transceiver 750. According to an example embodiment, communication signals received or transmitted through the antenna emitter 770 may be processed through the FEM 760 (for example, an element including a collection of a high pass filter, a diplexer, a switch, and an RX SAW filter).

According to various example embodiments, the FPGA 710, which may, for example, be a sensor hub for example, may receive state information of the electronic device 700 from the AP 720. According to an example embodiment, the FPGA 710 may receive communication information of the electronic device 700 from the CP 730 and/or the transceiver 750.

According to various example embodiments, the FPGA 710 may determine a current mode of the electronic device 700 by checking a lookup table (for example, a table illustrated in FIG. 9) stored in the memory 712 based on the state information of the electronic device 700 received from the AP 720 and the communication information of the electronic device 700 received from the CP 730, and may provide a control signal mapped onto the determined mode to at least one tunable circuit 740. According to an example embodiment, the lookup table may include values which are mapped onto control signals by a device developer to control the tunable circuit 740 based on each mode of the electronic device 700 and shift an operating frequency band of an antenna emitter. According to an example embodiment, the electronic device 700 may rapidly transmit a control signal for each mode to the at least one tunable circuit 740 using the lookup table pre-stored in the memory 712 of the FPGA 710.

Figure 8:
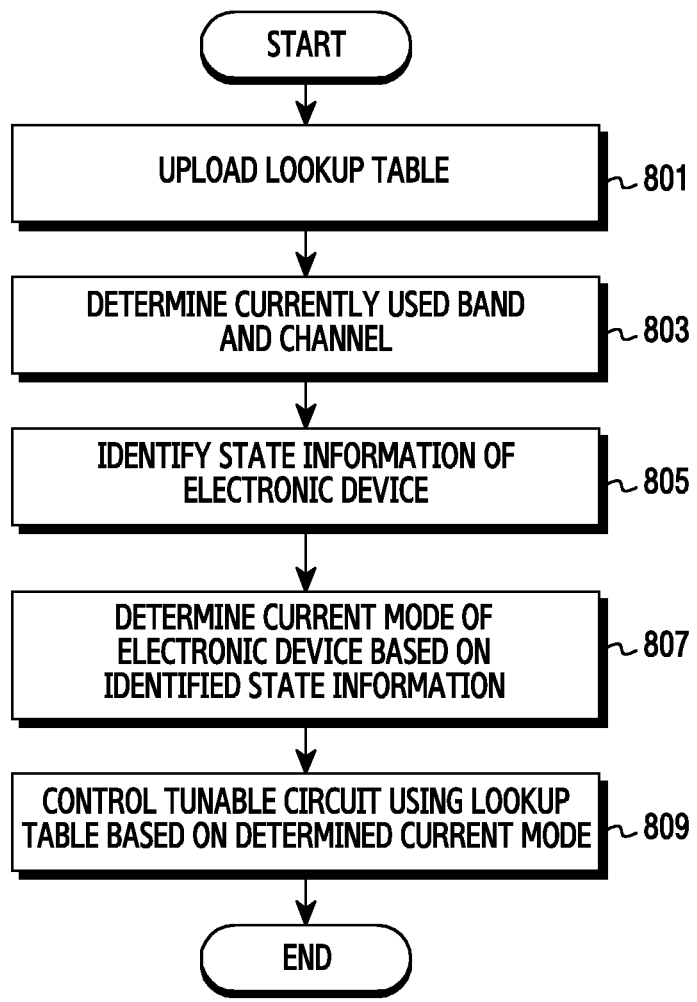
FIG. 8 is a flowchart illustrating an example method for controlling a tunable circuit according to state information of an electronic device according to various example embodiments of the present disclosure.

FIG. 8 is a flowchart illustrating an example method of controlling a tunable circuit according to state information of an electronic device according to various example embodiments of the present disclosure. FIG. 9 is a diagram illustrating an example lookup table (LUT) in which switching states of a pair of tunable circuits and corresponding control signals are mapped onto each other according to state information of the electronic device according to various example embodiments of the present disclosure.

Referring to FIGS. 7 and 8, when power is turned on, the electronic device (for example, the FPGA) may perform operation 801 of uploading the lookup table. According to one embodiment, the electronic device 700 may generate a control signal for switching at least one tunable circuit 740 by loading the lookup table stored in the memory 712 of the FPGA 710.

In operation 803, the electronic device 700 may receive communication information from the CP 730 and determine a currently used frequency band and a channel of the electronic device. According to an example embodiment, in operation 805, the electronic device 700 may receive state information of the electronic device 700 from the AP 720. According to an example embodiment, the electronic device 700 may receive state information of the electronic device 700 from the AP 720, and may receive communication information of the electronic device 700 from the CP 730. According to an example embodiment, the state information of the electronic device 700 may include information that is detected by at least one electronic component disposed in the electronic device 700. According to an example embodiment, the state information may include information on proximity or distance of an object, which is obtained by a proximity sensor, information on whether the electronic device is gripped, which is obtained by a grip sensor, information on whether a display is turned on/off, or posture information of the electronic device obtained by an acceleration sensor. According to an example embodiment, the communication information may include information on a frequency use band currently used by the electronic device 700 or channel information.

In operation 807, the electronic device 700 may determine a current mode of the electronic device 700 based on the information identified from the AP 720 and the CP 730. For example, the electronic device 700 may determine whether the current communication mode is a voice communication mode or a data communication mode. According to an example embodiment, when the current communication mode is the voice communication mode, the electronic device 700 may detect whether a user's head approaches by means of the proximity sensor, and/or detect whether the electronic device 700 is gripped by the user by means of the grip sensor. According to an example embodiment, when the current communication mode is the data communication mode, the electronic device 700 may detect whether the electronic device 700 is gripped by the user.

According to an example embodiment, after determining one of the various modes based on the identified communication information and state information, the electronic device 700 may control the at least one tunable circuit 740 using a control signal of the lookup table based on the determined current mode in operation 809. For example, the FPGA 710 may refer to the lookup table stored in the memory 712, and provide a control signal corresponding to the determined current mode to the at least one tunable circuit 740. According to an example embodiment, the tunable circuit 740 may control the switching circuit based on the received control signal, thereby adjusting an electric length of an antenna emitter. According to an example embodiment, the antenna emitter having the electric length adjusted may have an operating frequency band shifted. According to an example embodiment, the operating frequency band may be shifted to 700 MHz, 800 MHz, 900 MHz, or 850 MHz in a low band.

Hereinafter, an example embodiment in which an electric length of an antenna emitter is adjusted by controlling a pair of tunable circuits will be described in greater detail with reference to the lookup table of FIG. 9 and FIGS. 10A, 10B, 10C and 10D.

FIGS. 10A, 10B, 10C and 10D are diagrams illustrating example electric lengths of a metal member according to switching of a tunable circuit according to various example embodiments of the present disclosure.

The housing of FIGS. 10A to 10D may be similar to the housing 310 of FIG. 3, the housing 410 of FIG. 4, or the housing 510 of FIG. 5, or may include other embodiments of the housing.

Figure 10A:
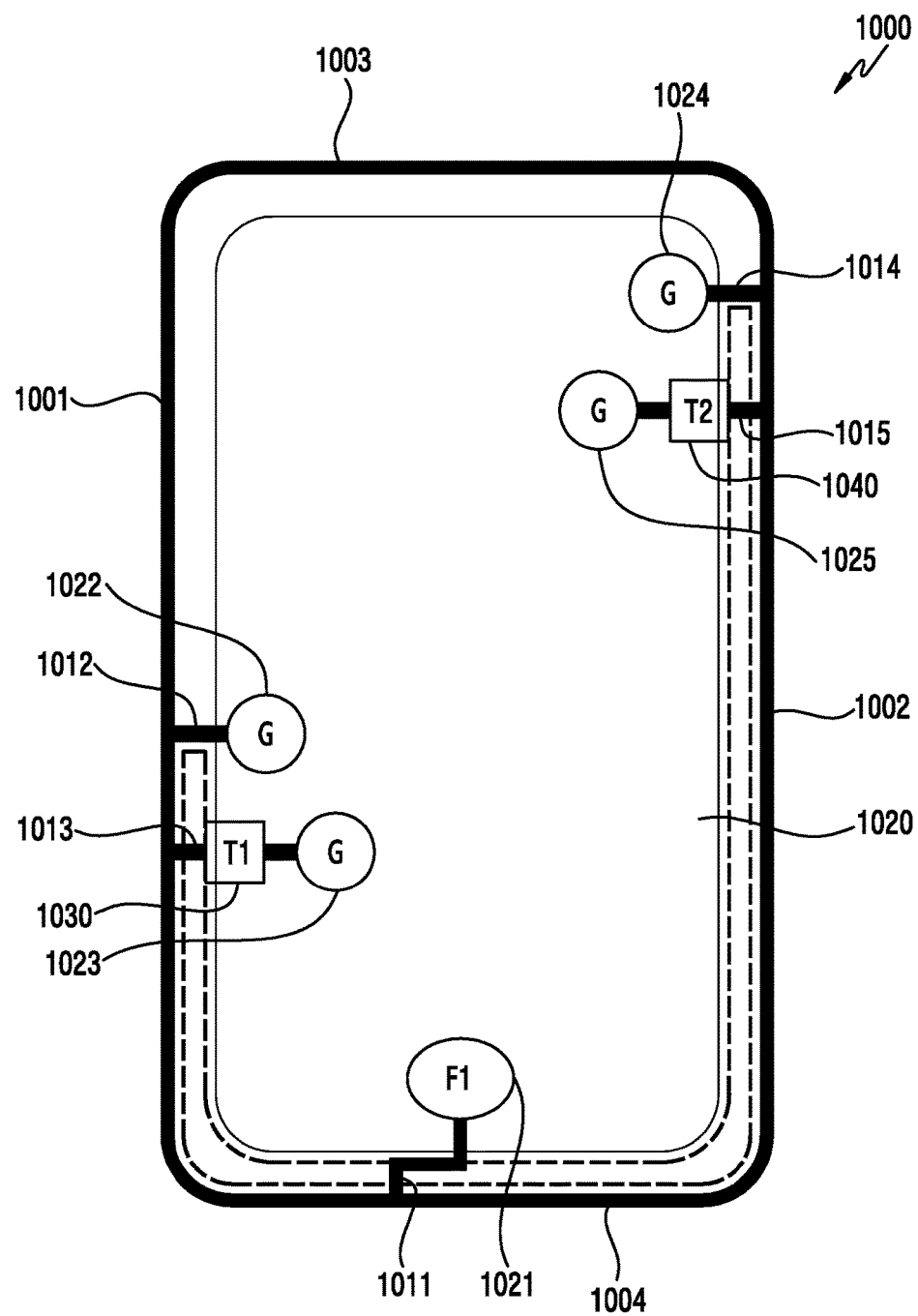
FIGS. 10A, 10B, 10C and 10D are diagrams illustrating example electric lengths of a metal member according to switching of a tunable circuit according to various example embodiments of the present disclosure.

Referring to FIG. 10A, when viewed from the front surface, the housing 1000 may include a left conductive member 1001, a right conductive member 1002, an upper conductive member 1003, and a lower conductive member 1004 extending from one another to have a loop shape. According to an example embodiment, the lower conductive member 1004 may include a feeding region 1011 electrically connected with a feeder 1021 of a substrate 1020. According to an example embodiment, the left conductive member 1001 may include a first ground region 1012 electrically connected with a first ground 1022 of the substrate 1020. According to an example embodiment, the left conductive member 1001 may include a first connection region 1013 electrically connected with a second ground 1023 of the substrate 1020 and having a first tunable circuit (T1) 1030 interposed between the second ground 1023 and the first connection region 1013. According to an example embodiment, the first connection region 1013 may be interposed between the feeding region 1011 and the first ground region 1012.

According to various example embodiments, the right conductive member 1002 may include a second ground region 1014 electrically connected with a third ground 1024 of the substrate 1020. According to an example embodiment, the right conductive member 1002 may include a second connection region 1015 electrically connected with a fourth ground 1025 of the substrate 1020 and having a second tunable circuit (T2) 1040 interposed between the fourth ground 1025 and the second connection region 1015. According to an example embodiment, the second connection region 1015 may be interposed between the feeding region 1011 and the second ground region 1024.

According to various example embodiments, as illustrated in FIG. 10A, the electronic device may identify state information indicating that the electronic device is a call connection state and the proximity sensor and the grip sensor are idle, and communication information indicating that a current operating frequency band is 700 MHz, and may provide a control signal (for example, corresponding to a control signal (0, 0, 0-0, 0, 0) of state table 1-1 of FIG. 9) corresponding to the corresponding mode to the tunable circuits 1030 and 1040. According to an example embodiment, the first tunable circuit 1030 may control a switching circuit to open the first connection region 1013 and the second ground 1023 based on the received control signal, and the second tunable circuit 1040 may control a switching circuit to open the second connection region 1015 and the fourth ground 1025, such that the antenna emitter operates in a frequency band of 700 MHz having an electric length illustrated by the dashed line as shown in the drawing.

Figure 10B:
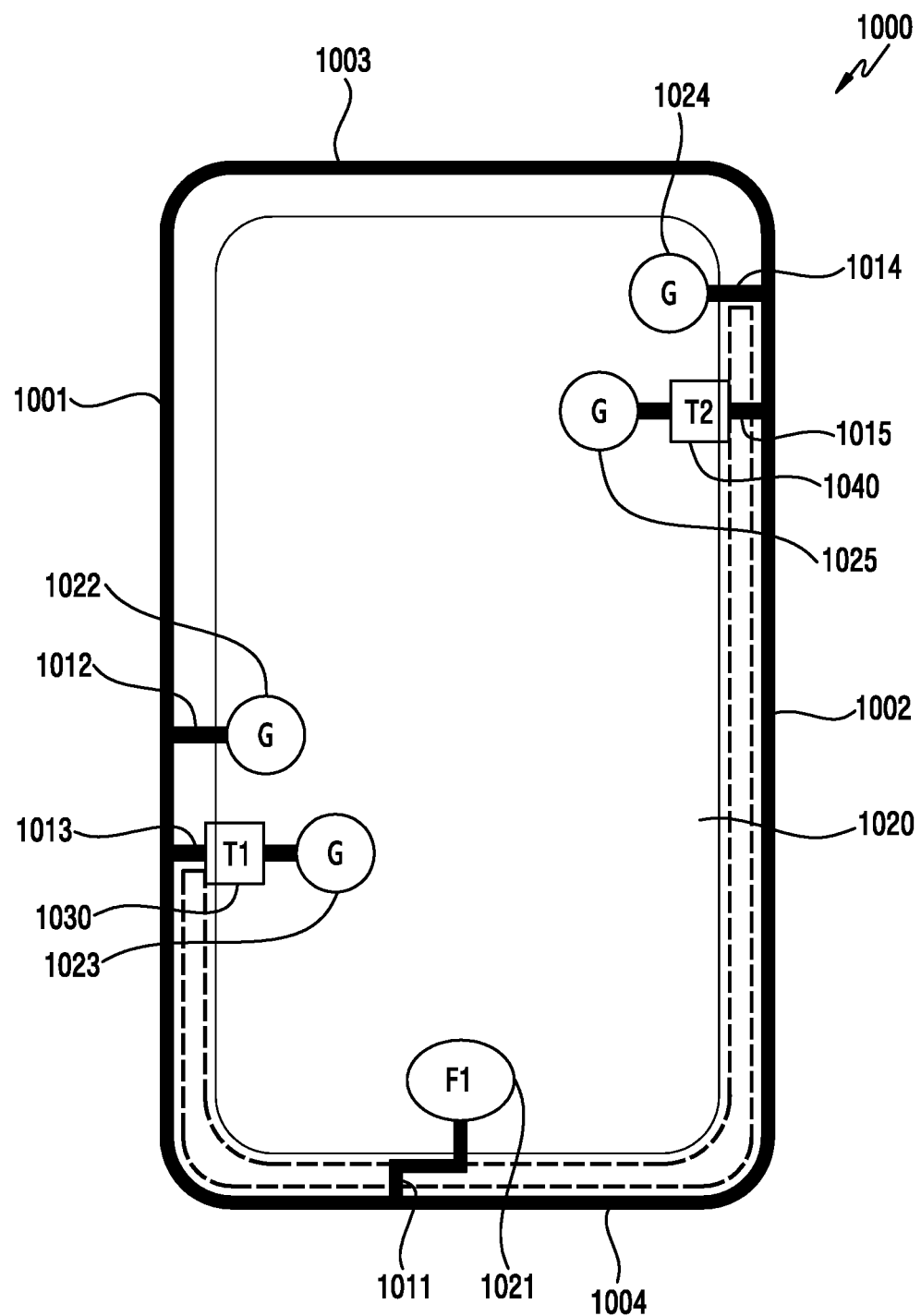

According to various example embodiments, as illustrated in FIG. 10B, the electronic device may identify state information indicating that the electronic device is a call connection state and the proximity sensor and the grip sensor are idle, and communication information indicating that a current operating frequency band is 800 MHz, and may provide a control signal (for example, corresponding to a control signal (0, 0, 1-0, 0, 0) of state table 2-1 of FIG. 9) corresponding to the corresponding mode to the tunable circuits 1030 and 1040. According to an example embodiment, the first tunable circuit 1030 may control the switching circuit to short the first connection region 1013 and the second ground 1023 based on the received control signal, and the second tunable circuit 1040 may control the switching circuit to open the second connection region 1015 and the fourth ground 1025, such that the antenna emitter operates in a frequency band of 800 MHz having an electric length illustrated by the dashed line as shown in the drawing.

Figure 10C:
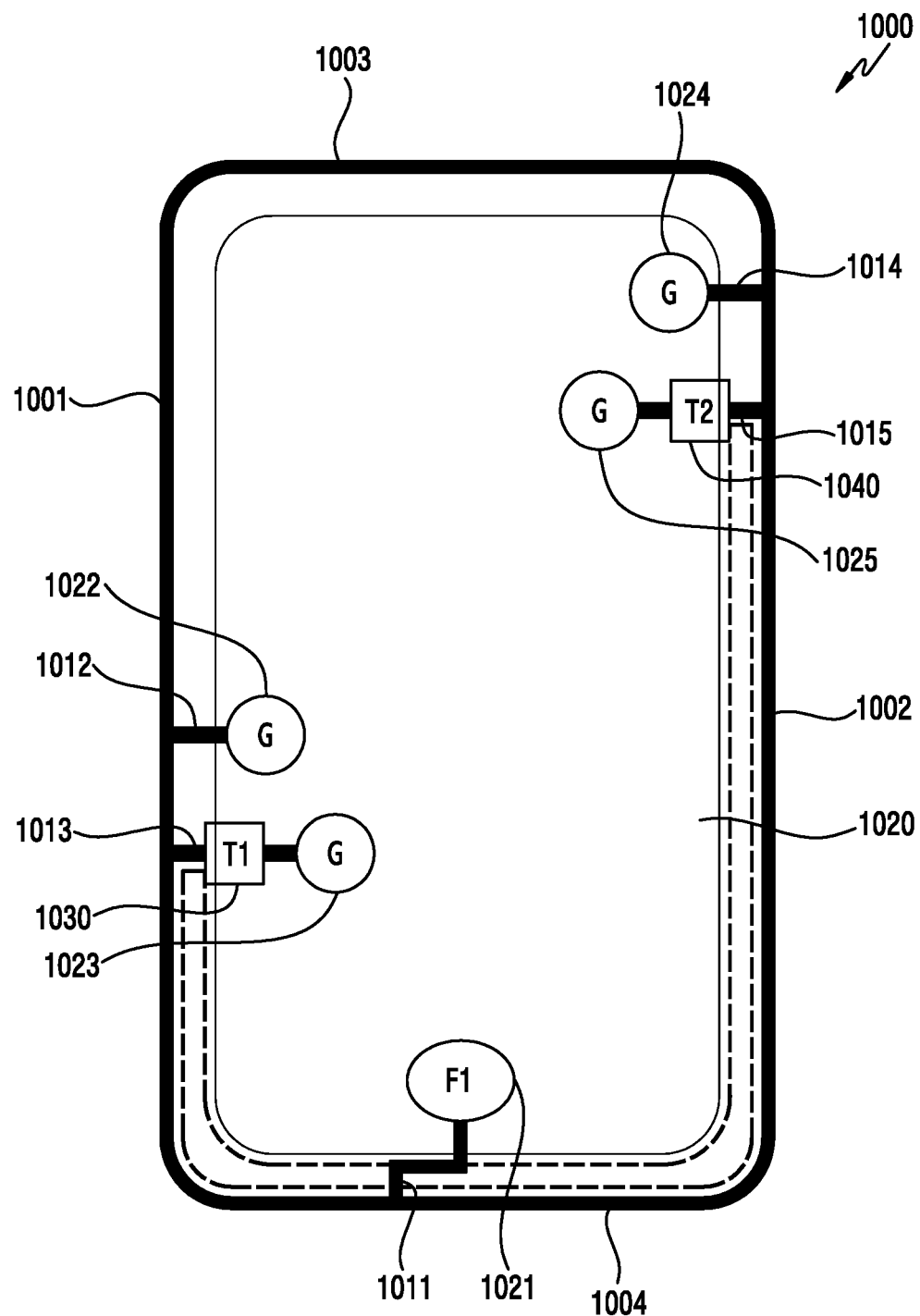

According to various example embodiments, as illustrated in FIG. 10C, the electronic device may identify state information indicating that the electronic device is a call connection state and the proximity sensor and the grip sensor are idle, and communication information indicating that a current operating frequency band is 900 MHz, and may provide a control signal (for example, corresponding to a control signal (0, 0, 1-0, 0, 1) of state table 2-2 of FIG. 9) corresponding to the corresponding mode to the tunable circuits 1030 and 1040. According to an example embodiment, the first tunable circuit 1030 may control the switching circuit to short the first connection region 1013 and the second ground 1023 based on the received control signal, and the second tunable circuit 1040 may control the switching circuit to short the second connection region 1015 and the fourth ground 1025, such that the antenna emitter operates in a frequency band of 900 MHz having an electric length illustrated by the dashed line as shown in the drawing.

Figure 10D:
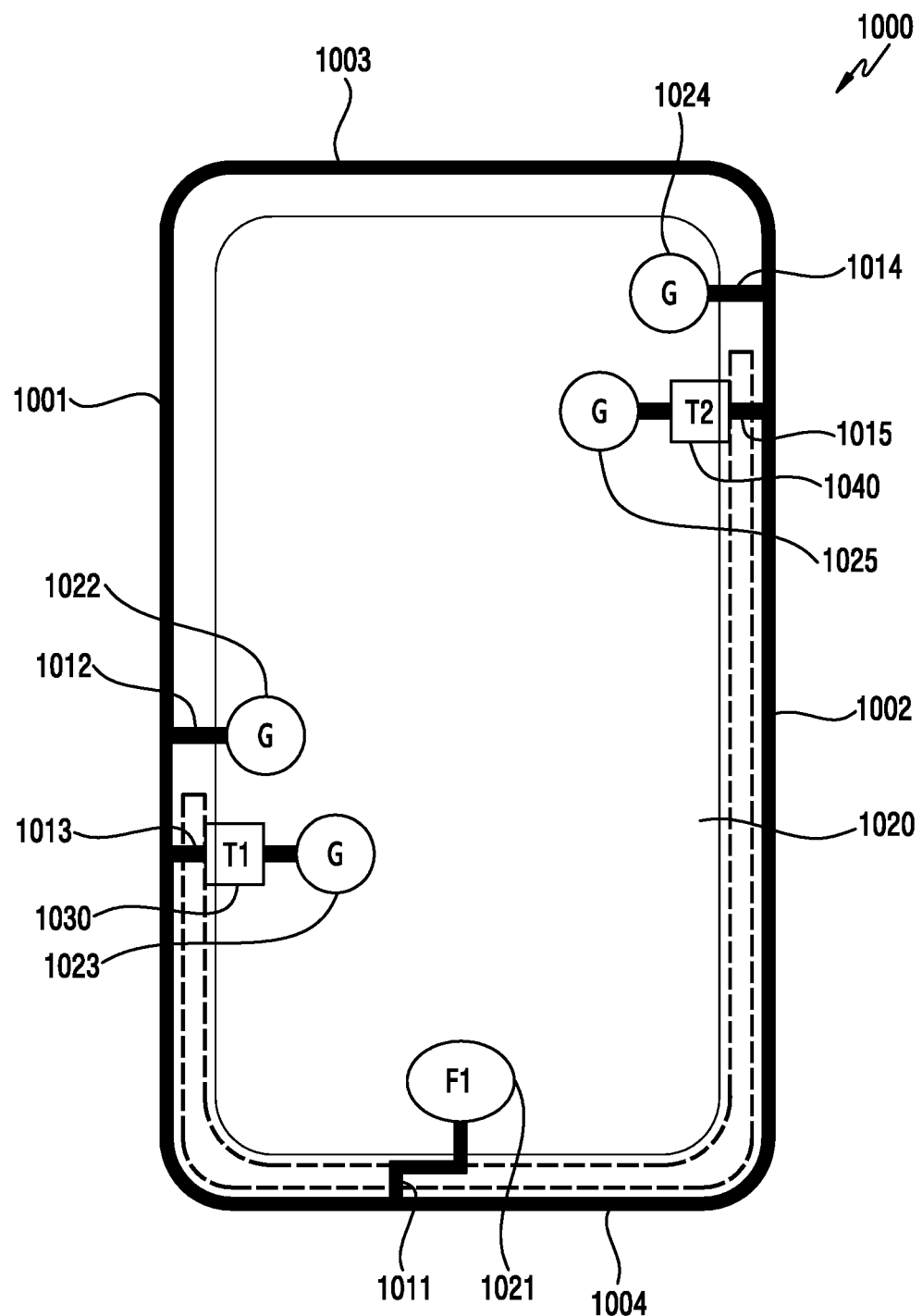

According to various example embodiments, as illustrated in FIG. 10D, when determined frequency band information is 850 MHz, the electronic device may provide a control signal corresponding to the corresponding mode to the tunable circuits 1030 and 1040. For example, the first tunable circuit 1030 may control the switching circuit based on the received control signal to include a capacitor having a first value (for example, 18 pF) in an electric connection path between the first connection region 1013 and the second ground 1023, and the second tunable circuit 1040 may also control the switching circuit based on the received control signal to include a capacitor having a second value (for example, 18 pF) in an electric connection path between the second connection region 1015 and the fourth ground 1025, such that the antenna emitter operates in a frequency band of 850 MHz having an electric length illustrated by the dashed line as shown in the drawing.

Figure 11:
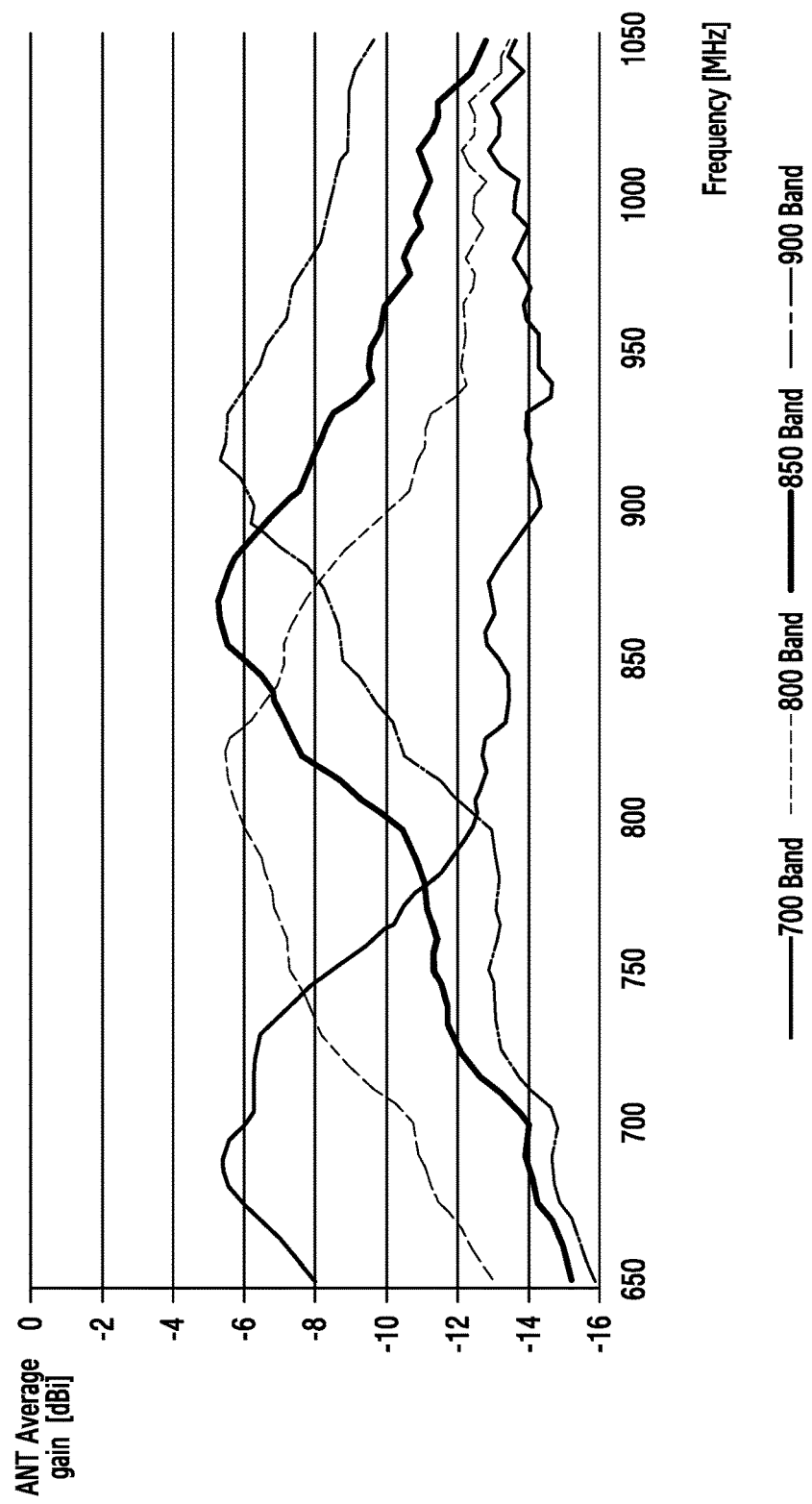
FIG. 11 is a graph illustrating example operating frequency bands according to FIGS. 10A, 10B, 10C and 10D according to various example embodiments of the present disclosure.

FIG. 11 is a graph illustrating operating frequency bands according to FIGS. 10A to 10D according to various example embodiments of the present disclosure, and it can be seen that, when the first tunable circuit 1030 and the second tunable circuit 1040 are controlled based on a control signal provided from the controller (for example, the FPGA) of the electronic device, the electronic device can smoothly operate in respective operating frequency bands as desired (for example, a band of 700 MHz, a band of 800 Mhz, a band of 900 MHz, or a band of 850 MHz).

Figure 12:
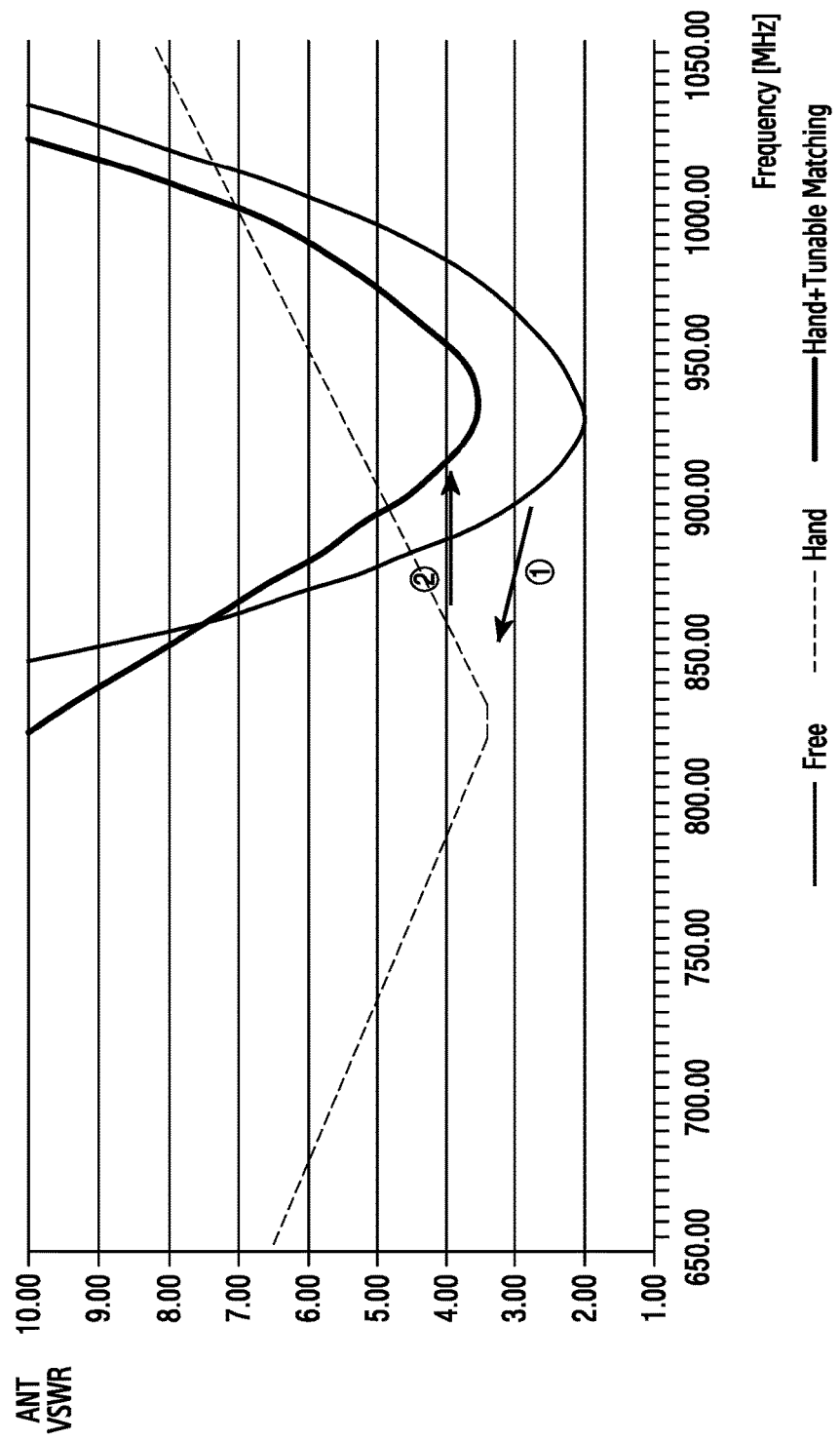
FIG. 12 is a graph illustrating example voltage standing wave ratio (VSWR) of an antenna with an operating frequency band adjusted by a tunable circuit when an electronic device is gripped according to various example embodiments of the present disclosure.

FIG. 12 is a graph illustrating example VSWR of an antenna with an operating frequency band adjusted by a tunable circuit when an electronic device is gripped according to various example embodiments of the present disclosure.

Referring to FIG. 12, an electronic device including an antenna emitter (for example, a conductive member) operating in an operating frequency band of 900 MHz may have an unwanted shift phenomenon (①) of FIG. 12) that the electronic device shifts from the operating frequency band of 900 MHz to the frequency band of 800 MHz by a user gripping the electronic device.

According to various example embodiments, the electronic device may identify current communication information and identify state information indicating that the electronic device is gripped by the user by means of the grip sensor, and determine a current mode of the electronic device based on the identified information. According to an example embodiment, the electronic device may identify a control signal mapped onto the determined mode based on a lookup table stored in a memory. According to an example embodiment, the electronic device may control as illustrated in FIG. 10D by providing the identified control signal to the tunable circuits. According to an example embodiment, the first tunable circuit 1030 may control the switching circuit based on the received control signal to include a capacitor having 6 pF in the electric connection path between the first connection region 1013 and the second ground 1023, and the second tunable circuit 1040 may also control the switching circuit based on the received control signal to include a capacitor having 6 pF in the electric connection path between the second connection region 1015 and the fourth ground 1025. According to an example embodiment, the antenna emitter may shift from the frequency band of 800 MHz back to the desired frequency band of 900 MHz (②) of FIG. 12) by the control operation of the tunable circuits 1030 and 1040.

According to various example embodiments, the electronic device may interpose at least one tunable circuit in an electric connection line of an antenna and may switch the tunable circuit adaptively based on a state change of the electronic device, such that it can contribute to slimness of the electronic device and can shift to various operating frequency bands in the low band, and simultaneously, does not influence the mid band and the high band. Therefore, reliability of the electronic device can be guaranteed.

According to various example embodiments, an electronic device is provided, including: a housing; a conductive member which is formed as a part of the housing or disposed in the housing as at least a part of the housing; a communication circuit electrically connected to a first region of the conductive member; a ground electrically connected to a second region spaced from the first region of the conductive member; a tunable circuit interposed in an electric connection path electrically connected with the ground in a third region between the first region and the second region of the conductive member; and at least one processor configured to generate a corresponding control signal based on a current mode of the electronic device and to provide the control signal to the tunable circuit.

According to various example embodiments, the first region, the second region, and the third region of the conductive member may extend from one another seamlessly.

According to various example embodiments, the conductive member may be operated as a multi-band antenna emitter in a low band and a mid band or a low band and a high band by the communication circuit, and may be controlled by the tunable circuit to have an operating frequency band in a low band shifted.

According to various example embodiments, the processor may be configured to control the conductive member to operate in any one of frequency bands of a low band of 700 MHz, 800 MHz, 900 MHz, or 850 MHz through the tunable circuit.

According to various example embodiments, the tunable circuit may include: a control circuit configured to detect a control signal provided from the processor; and a switching circuit configured to be controlled by the control circuit, and the switching circuit may include: a first port configured to electrically connect the conductive member to the ground through at least one element having a specific value; and a second port configured to directly and electrically connect the conductive member to the ground.

According to various example embodiments, the switching circuit may further include a third port configured to open the conductive member and the ground.

According to various example embodiments, the first port may include at least one unit port having a specific element value, and, when the switching circuit is connected to the first port, the switching circuit may be electrically connected to any one of the at least one unit port.

According to various example embodiments, the at least one element may include at least one capacitor having a different capacitance value.

According to various example embodiments, the processor may be configured to provide the at least one tunable circuit with a corresponding control signal identified from a lookup table stored in a memory based on at least one detected piece of information of state information and communication information of the electronic device.

According to various example embodiments, the state information may include at least one piece of information from among: proximity information of an object obtained by a proximity sensor, grip information of the electronic device obtained by a grip sensor, on/off information of a display, and posture information of the electronic device obtained by an acceleration sensor, and the communication information may include information on a frequency use band currently used by the electronic device or channel information.

According to various example embodiments, the processor may include an FPGA including at least one memory configured to store a lookup table in which a control signal is mapped according to each mode.

According to various example embodiments, the conductive member may be electrically connected to the ground through a fourth region opposite to the second region with reference to the first region, and may be electrically connected to the ground through a fifth region between the second region and the fourth region, and the electronic device may include another tunable circuit which is interposed in an electric connection path connecting the fifth region and the ground, and has a same configuration as that of the control circuit. The processor may be configured to control the tunable circuit and the another tunable circuit.

According to various example embodiments, the processor may be configured to shift the operating frequency band by changing an electric length of the conductive member used as an antenna emitter under control of the tunable circuit.

According to various example embodiments, a method for operating of an electronic device is provided, wherein the electronic includes a conductive member connected with a communication circuit and a ground in different regions and operating as an antenna, and at least one tunable circuit interposed in an electric path through which the conductive member and the ground are connected to each other, the method including: identifying at least one piece of information of state information and communication information of the electronic device; determining a current mode of the electronic device based on the identified information; determining a control signal based on the determined mode; and controlling the tunable circuit using the determined control signal to shift an operating frequency band of the conductive member.

According to various example embodiments, determining the current mode of the electronic device includes determining the current mode based on: state information including at least one piece of information from among proximity information of an object obtained by a proximity sensor, grip information of the electronic device obtained by a grip sensor, on/off information of a display, and posture information of the electronic device obtained by an acceleration sensor or information on a frequency use band currently used by the electronic device or channel information.

According to various example embodiments, determining the corresponding control signal may include selecting a control signal corresponding to the determined mode from a lookup table stored in a memory.

According to various example embodiments, controlling the tunable circuit using the control signal may include opening or shorting an electric path connected with the ground in the electric length using a switching circuit, or electrically connecting the conductive member to the ground through at least one element having a specific value.

According to various example embodiments, the at least one element may include at least one capacitor having a different capacitance value.

According to various example embodiments, the conductive member may be operated as a multi-band antenna emitter in a low band and a mid band or a low band and a high band, and the operating frequency band in the low band may be shifted under control of the tunable circuit.

According to various example embodiments, the shifted frequency band may include any one of bands of 700 MHz, 800 MHz, 900 MHz, or 850 MHz.

The various example embodiments disclosed in the present disclosure and drawings are merely example embodiments provided to aid in understanding the technical features, and are not intended to limit the scope of the present disclosure. Therefore, the scope of the present disclosure is defined not by the detailed description but by the appended claims, and all differences within the scope should be understood as being included in the present disclosure.

What is claimed is:
1. An electronic device comprising:
a housing;

a conductive member formed as a part of the housing or disposed in the housing as at least a part of the housing;

a communication circuit electrically connected to a first region of the conductive member;

a ground electrically connected to a second region of the conductive member spaced from the first region of the conductive member;

a tunable circuit interposed in an electric connection path electrically connected with the ground in a third region of the conductive member, the third region being located between the first region and the second region of the conductive member; and at least one processor configured to generate a control signal based on a current mode of the electronic device and to provide the control signal to the tunable circuit.

2. The electronic device of claim 1, wherein the first region, the second region, and the third region of the conductive member extend from one another seamlessly.

3. The electronic device of claim 1, wherein the conductive member is configured to operate as a multi-band antenna emitter in a low band and is configured to operate as a mid band or a low band and a high band by the communication circuit, and is configured to be controlled by the tunable circuit to have an operating frequency band in a low band shifted.

4. The electronic device of claim 3, wherein the processor is configured to control the conductive member to operate in any one of frequency bands of a low band of 700 MHz, 800 MHz, 900 MHz, or 850 MHz through the tunable circuit.

5. The electronic device of claim 1, wherein the tunable circuit comprises:

a control circuit configured to detect a control signal provided by the processor; and a switching circuit configured to be controlled by the control circuit, and wherein the switching circuit comprises:

a first port configured to electrically connect the conductive member to the ground through at least one element having a specific value; and a second port configured to directly and electrically connect the conductive member to the ground.

6. The electronic device of claim 5, wherein the switching circuit further comprises a third port configured to open an electrical path between the conductive member and the ground.

7. The electronic device of claim 5, wherein the first port comprises at least one unit port each of the at least one unit port having a specific element value, and, when the switching circuit is connected to the first port, the switching circuit is configured to be electrically connected to any one of the at least one unit port.

8. The electronic device of claim 5, wherein the at least one element comprises at least one capacitor, each of the at least one capacitor having a different capacitance value.

9. The electronic device of claim 1, wherein the processor is configured to provide the at least one tunable circuit with a corresponding control signal identified from a lookup table stored in a memory based on at least one detected piece of information of state information and communication information of the electronic device.

10. The electronic device of claim 9, wherein the state information comprises at least one piece of information from among: proximity information of an object obtained by a proximity sensor, grip information of the electronic device obtained by a grip sensor, on/off information of a display, and posture information of the electronic device obtained by an acceleration sensor, and wherein the communication information comprises information on a frequency use band currently used by the electronic device or channel information.

11. The electronic device of claim 1, wherein the processor comprises an FPGA comprising at least one memory in which a lookup table in which a control signal is mapped to a switching state based on each mode is stored.

12. The electronic device of claim 1, wherein the conductive member is electrically connected to the ground through a fourth region opposite to the second region with reference to the first region, and is electrically connected to the ground through a fifth region between the second region and the fourth region, wherein the electronic device comprises another tunable circuit interposed in an electric connection path connecting the fifth region and the ground, the another tunable circuit having a same configuration as that of the tunable circuit, and wherein the processor is configured to control the tunable circuit and the another tunable circuit.

13. The electronic device of claim 12, wherein the processor is configured to shift an operating frequency band by changing an electric length of the conductive member used as an antenna emitter under control of the tunable circuit.

14. A method for operating of an electronic device, the electronic device comprising a conductive member connected to a communication circuit and a ground in different regions and operating as an antenna, and at least one tunable circuit interposed in an electric path through which the conductive member and the ground are connected to each other, the method comprising:

identifying, by at least one processor of the electronic device, at least one piece of information of: state information and communication information of the electronic device;

determining, by the at least one processor, a current mode of the electronic device based on the identified information;

transmitting, by the at least one processor, to the tunable circuit, a control signal based on the determined current mode; and controlling, by the at least one processor, the tunable circuit to shift, based on the determined control signal, an operating frequency band of the conductive member.

15. The method of claim 14, wherein determining the current mode of the electronic device comprises determining the current mode based on:

state information comprising at least one piece of information from among: proximity information of an object obtained by a proximity sensor, grip information of the electronic device obtained by a grip sensor, on/off information of a display, and posture information of the electronic device obtained by an acceleration sensor, or information on a frequency use band currently used by the electronic device or channel information.

16. The method of claim 14, wherein the transmitting the control signal comprises selecting a control signal corresponding to the determined mode from a lookup table stored in a memory.

17. The method of claim 14, wherein controlling the tunable circuit to shift the operating frequency band comprises opening or shorting an electrical path connected with the ground in an electrical length of the conductive member using a switching circuit, or electrically connecting the conductive member to the ground through at least one element having a specific value.

18. The method of claim 17, wherein the at least one element comprises at least one capacitor, each of the at least one capacitor having a different capacitance value.

19. The method of claim 14, wherein the conductive member is operated as a multi-band antenna emitter in a low band and a mid band or a low band and a high band, and
   wherein the operating frequency band in the low band is shifted under control of the tunable circuit.

20. The method of claim 19, wherein the shifted frequency band comprises any one of bands of: 700 MHz, 800 MHz, 900 MHz, or 850 MHz.

* * * * *